(12) United States Patent
Baba

(10) Patent No.: US 9,798,002 B2
(45) Date of Patent: Oct. 24, 2017

(54) OBJECT DETECTION APPARATUS

(71) Applicant: DENSO CORPORATION, Kariya, Aichi-pref (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 346 days.

(21) Appl. No.: 14/086,405

(22) Filed: Nov. 21, 2013

(65) Prior Publication Data
US 2014/0139369 A1  May 22, 2014

(30) Foreign Application Priority Data

Nov. 22, 2012 (JP) .................. 2012-256331
Aug. 28, 2013 (JP) .................. 2013-177014

(51) Int. Cl.
 G01S 13/93 (2006.01)
 G01S 13/86 (2006.01)
 G01S 13/50 (2006.01)

(52) U.S. Cl.
 CPC ............ *G01S 13/867* (2013.01); *G01S 13/50* (2013.01)

(58) Field of Classification Search
 CPC ................. G01S 13/867; G01S 13/50
 (Continued)

(56) References Cited

U.S. PATENT DOCUMENTS 6,191,704 B1 * 2/2001 Takenaga ............ G01S 13/931
 180/169
7,522,747 B2 * 4/2009 Horibe ................. B60R 1/00
 342/118

(Continued)

FOREIGN PATENT DOCUMENTS

JP 2002-183737 6/2002
JP 2002-189075 7/2002
(Continued)

OTHER PUBLICATIONS

Kai-Tai Song and Chih-Chieh Yang, "Front vehicle tracking using scene analysis," IEEE International Conference Mechatronics and Automation, 2005, Niagara Falls, Ont., Canada, 2005, pp. 1323-1328 vol. 3.*

(Continued)

*Primary Examiner* — Marcus Windrich

(74) *Attorney, Agent, or Firm* — Harness, Dickey & Pierce, P.L.C.

(57) ABSTRACT

An object detection apparatus mounted in a vehicle, includes a first domain definition unit, a second domain definition unit, and a determination unit. The first domain definition unit defines a first object domain including a first detection point which is indicative of a position of a first object detected by using a vehicle-mounted radar. The second domain definition unit defines a second object domain including a second detection point which is indicative of a position of a second object detected on the basis of an image captured by a vehicle-mounted monocular camera. The determination unit determines whether or not an overlapping domain of the first and second object domains is present, and when it is determined that an overlapping domain of the first and second object domains is present, then determines that the first and second objects are the same.

24 Claims, 13 Drawing Sheets

(58) Field of Classification Search
USPC ..................................... 342/118, 139, 70–72
See application file for complete search history.

(56) References Cited

U.S. PATENT DOCUMENTS

| | | | | |
|---|---|---|---|---|
| 7,825,849 | B2* | 11/2010 | Tsuchida | G01S 13/931 |
| | | | | 342/52 |
| 8,610,620 | B2* | 12/2013 | Katoh | G01S 13/931 |
| | | | | 342/52 |
| 2003/0011509 | A1 | 1/2003 | Honda | |
| 2003/0201929 | A1* | 10/2003 | Lutter | G01S 7/032 |
| | | | | 342/52 |
| 2004/0098224 | A1* | 5/2004 | Takahashi | G01S 7/4026 |
| | | | | 702/181 |
| 2007/0075892 | A1* | 4/2007 | Horibe | G01S 17/023 |
| | | | | 342/70 |
| 2008/0079954 | A1 | 4/2008 | Iwaki et al. | |
| 2011/0050482 | A1 | 3/2011 | Nanami | |
| 2011/0234761 | A1 | 9/2011 | Yumiba et al. | |
| 2012/0106786 | A1* | 5/2012 | Shiraishi | G01S 13/867 |
| | | | | 382/103 |
| 2014/0035775 | A1* | 2/2014 | Zeng | G01S 13/867 |
| | | | | 342/52 |
| 2015/0219761 | A1* | 8/2015 | Inomata | G08G 1/166 |
| | | | | 701/301 |

FOREIGN PATENT DOCUMENTS

| | | |
|---|---|---|
| JP | 2004-053278 | 2/2004 |
| JP | 2005-202878 | 7/2005 |
| JP | 2006-292475 | 10/2006 |
| JP | 2006-322853 | 11/2006 |
| JP | 2010-061567 | 3/2010 |
| JP | 2010-134878 | 6/2010 |
| JP | 2011-053139 | 3/2011 |
| JP | 2011-220766 | 11/2011 |
| JP | 2012-027000 | 2/2012 |
| JP | 2012-159469 | 8/2012 |
| WO | WO2011/036807 | 3/2011 |

OTHER PUBLICATIONS

Office Action dated Oct. 28, 2014 in corresponding Japanese Application No. 2013-177014.
Office Action dated Mar. 10, 2015 in corresponding Japanese Application No. 2013-177014.

* cited by examiner

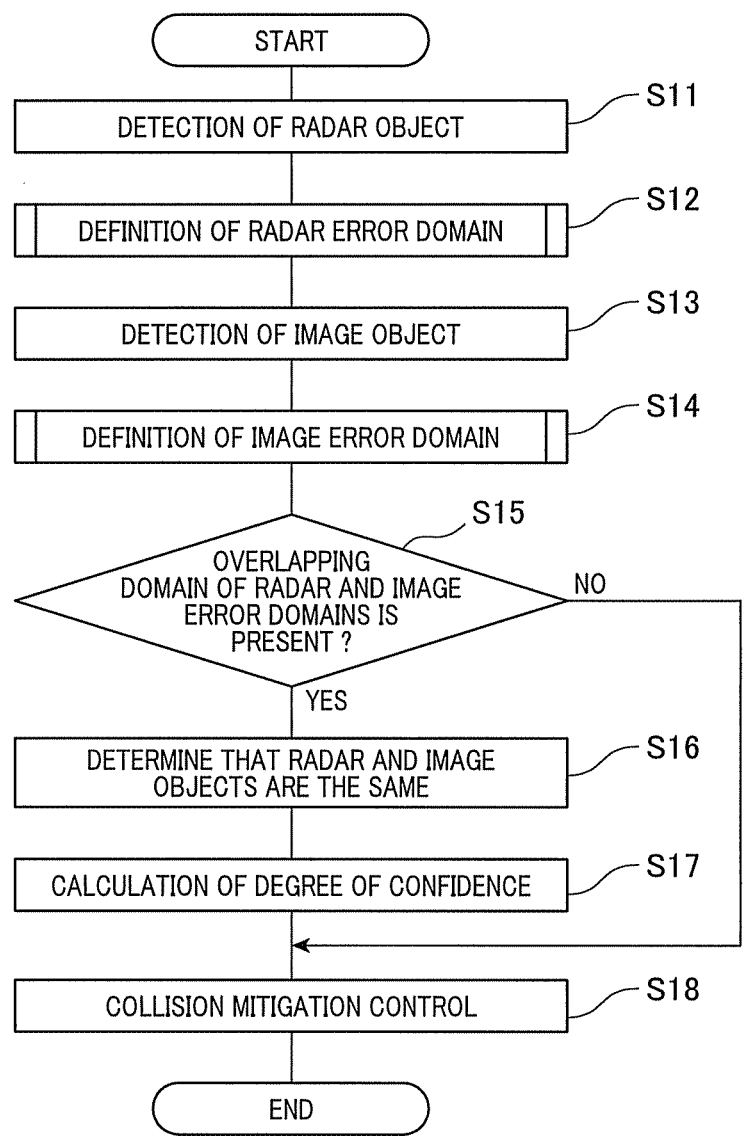

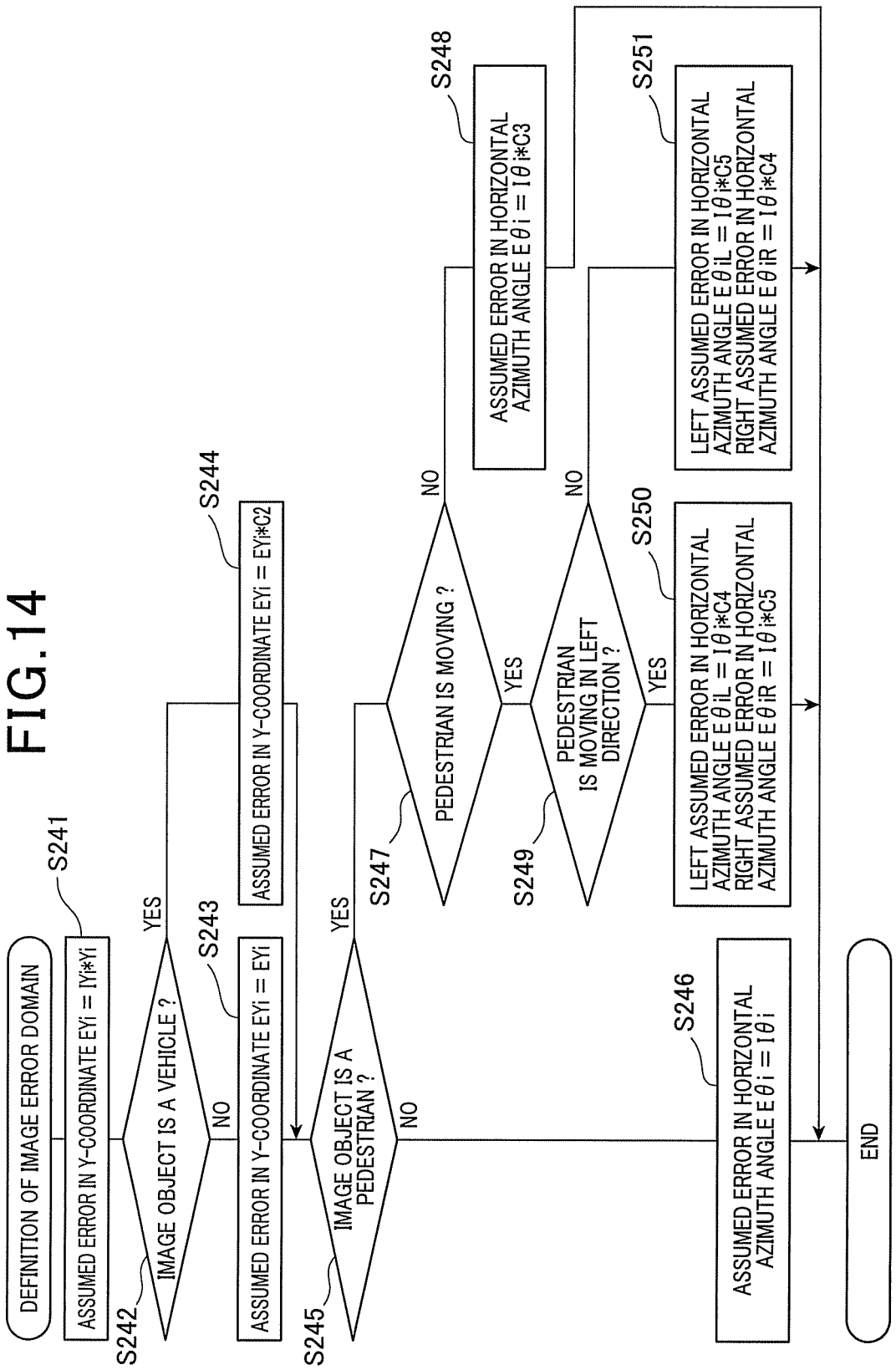

OBJECT DETECTION APPARATUS

CROSS-REFERENCE TO RELATED APPLICATION

This application is based on and claims the benefit of priority from earlier Japanese Patent Applications No. 2012-256331 filed Nov. 22, 2012 and No. 2013-177014 filed Aug. 28, 2013, the descriptions of which are incorporated herein by reference.

BACKGROUND

Technical Field

The present invention relates to detection of an object by using a radar and a camera.

Related Art

A vehicle collision avoidance system is required to accurately detect an object, such as a vehicle other than, a controlled vehicle (i.e., a vehicle in which the system is mounted) or a pedestrian. A vehicle collision avoidance system, as disclosed in Japanese Patent Application Laid-Open. Publication No. 2006-292475, is configured to detect an object by using a radar and a camera. More specifically, the disclosed vehicle collision avoidance system uses a millimeter-wave radar and a stereoscopic camera separately, and determines that an object detected by the millimeter-wave radar and an object detected by the stereoscopic camera are the same when a positional relationship therebetween meets a predetermined criterion.

It may be envisaged that, in a vehicle collision avoidance system alternative to the disclosed vehicle collision avoidance system, a monocular camera is used instead of the stereoscopic camera. However, the monocular camera and the stereoscopic camera are quite different from each other in principle of detecting a position, particularly, a forward distance, of an object relative to the controlled vehicle, and accuracy of detecting the forward distance of the object by the monocular camera is much lower than accuracy of detecting the forward distance of the object by the stereoscopic camera. Therefore, replacement of the stereoscopic camera with the monocular camera cannot lead to proper detection of the object.

In consideration of the foregoing, it would therefore be desirable to have an object detection apparatus capable of detecting an object more properly by using a radar and a monocular camera.

SUMMARY

In accordance with an exemplary embodiment of the present invention, there is provided an object detection apparatus mounted in a vehicle, including a first domain definition, unit, a second domain definition unit, and a determination unit.

The first domain definition unit is configured to define a first object domain including a first detection point which is indicative of a position of a first object detected by using a vehicle-mounted radar relative to a reference point on an XY-plane. An X-axis direction of the XY-plane is a vehicle widthwise direction, and a Y-axis direction of the XY-plane is a vehicle lengthwise direction.

The second domain definition unit is configured to define a second object domain including a second detection point which is indicative of a position of a second object detected on the basis of an image captured by a vehicle-mounted monocular camera relative to the reference point on the XY-plane.

The determination unit is configured to determine whether or not an overlapping domain of the first and second object domains is present on the XY-plane, and when it is determined that an overlapping domain of the first and second object domains is present on the XY-plane, then determine that the first and second objects are the same.

With this configuration, even when the first and second detection points do not coincide completely with each other, it may be determined that the first and second objects are the same. This can prevent a false determination that the first and second objects are different objects. Meanwhile, it is likely to be determined incorrectly that the first and second objects are the same although the first and second objects are actually different objects.

In the apparatus of the present embodiment, the second object domain is defined by a second azimuthal range of azimuth angle of the second object from the forward direction of the vehicle. This can prevent false determinations. That is, accuracy of detecting the azimuth angle of the second object on the basis of the captured image from the monocular camera is relatively high. Defining the second object domain by using such a second azimuthal range of azimuth angle leads to the second object domain being suited for characteristics of the monocular camera, as compared to cases where the second object domain is defined by an X-coordinate range that is constant in width over X-coordinates. This can prevent false determinations.

BRIEF DESCRIPTION OF THE DRAWINGS

In the accompanying drawings:

FIG. 2 shows a flowchart of a process performed in the collision mitigation ECU of the first embodiment;

FIG. 14 shows a flowchart of a process of defining an image error domain of the fifth embodiment;

DESCRIPTION OF SPECIFIC EMBODIMENTS

The present inventions will be described more fully hereinafter with reference to the accompanying drawings. Like numbers refer to like elements throughout.

(First Embodiment)

Figure 1A:
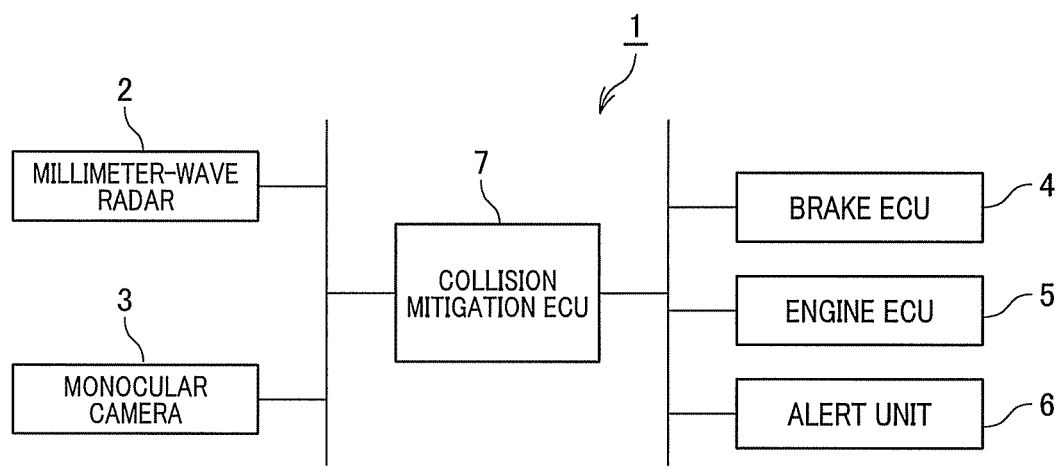
FIG. 1A shows a schematic block diagram of a collision mitigation apparatus in accordance with a first embodiment of the present invention.

FIG. 1A shows a schematic diagram of a collision mitigation apparatus 1 in accordance of a first embodiment of the present invention. The collision mitigation apparatus 1 is mounted in a vehicle (hereinafter referred to as a subject vehicle), and includes a millimeter-wave radar 2, a monocular camera 3, a brake electronic control unit (ECU) 4, an engine ECU 5, an alert unit 6, and a collision mitigation ECU 7. In the collision mitigation apparatus 1, for example, the collision mitigation ECU 7 is communicably connected to the millimeter-wave radar 2, the monocular camera 3, the brake ECU 4, the engine ECU 5, and the alert unit 6.

The millimeter-wave radar 2 is mounted in the front middle portion of the subject vehicle to detect objects, such as other vehicles and pedestrians, by using millimeter waves. The millimeter-wave radar 2 transmits millimeter waves forward from the subject vehicle while scanning in a horizontal plane and receives millimeter waves reflected back to thereby transmit transmitted and received data in the form of radar signals to the collision mitigation ECU 7.

The monocular camera 3 includes one charge-coupled device (CCD) camera, and is mounted in the front middle portion of the subject vehicle. The monocular camera 3 transmits data of captured images in the form of image signals to the collision mitigation ECU 7.

The brake ECU 4 includes CPU, ROM, RAM, and others to control braking of the subject vehicle. More specifically, the brake ECU 4 controls a brake actuator (brake ACT) in response to a detection value outputted from a sensor to detect a brake pedal depression amount, where the brake actuator serves as an actuator that opens and closes a pressure increasing control valve and a pressure reducing control valve provided in a brake hydraulic circuit. The brake ECU 4 controls the brake actuator following instructions from the collision mitigation ECU 7 so as to increase a braking force of the subject vehicle.

The engine ECU 5 includes CPU, ROM, RAM, and others to control engine start/shutdown, a fuel injection amount, the ignition time, and others. More specifically, the engine ECU 5 controls a throttle actuator (throttle ACT) in response to a detection value outputted from a sensor to detect an accelerator pedal depression amount, where the throttle actuator serves as an actuator that opens and closes a throttle valve provided in an air intake conduit. The engine ECU 5 controls the throttle actuator following instructions from the collision mitigation ECU 7 so as to decrease a driving force of the internal-combustion engine.

The alert unit 6, upon reception of a warning signal from the collision mitigation ECU 7, acoustically and optically alerts a driver of the subject vehicle.

The collision mitigation ECU 7 includes CPU, ROM, RAM, and others to integrally control the collision mitigation apparatus 1. The collision mitigation ECU 7 acquires radar signals from the millimeter-wave radar 2 and image signals from the monocular camera 3 every predetermined time interval based on a master clock.

There will now be explained an object detection process performed in the collision mitigation apparatus 1. An object detection program, i.e., a program for implementing the object detection process, is stored in the ROM or the like of the collision mitigation apparatus 1. FIG. 2 shows a flowchart of the object detection process performed in the collision mitigation apparatus 1 every predetermined time interval.

Figure 3:
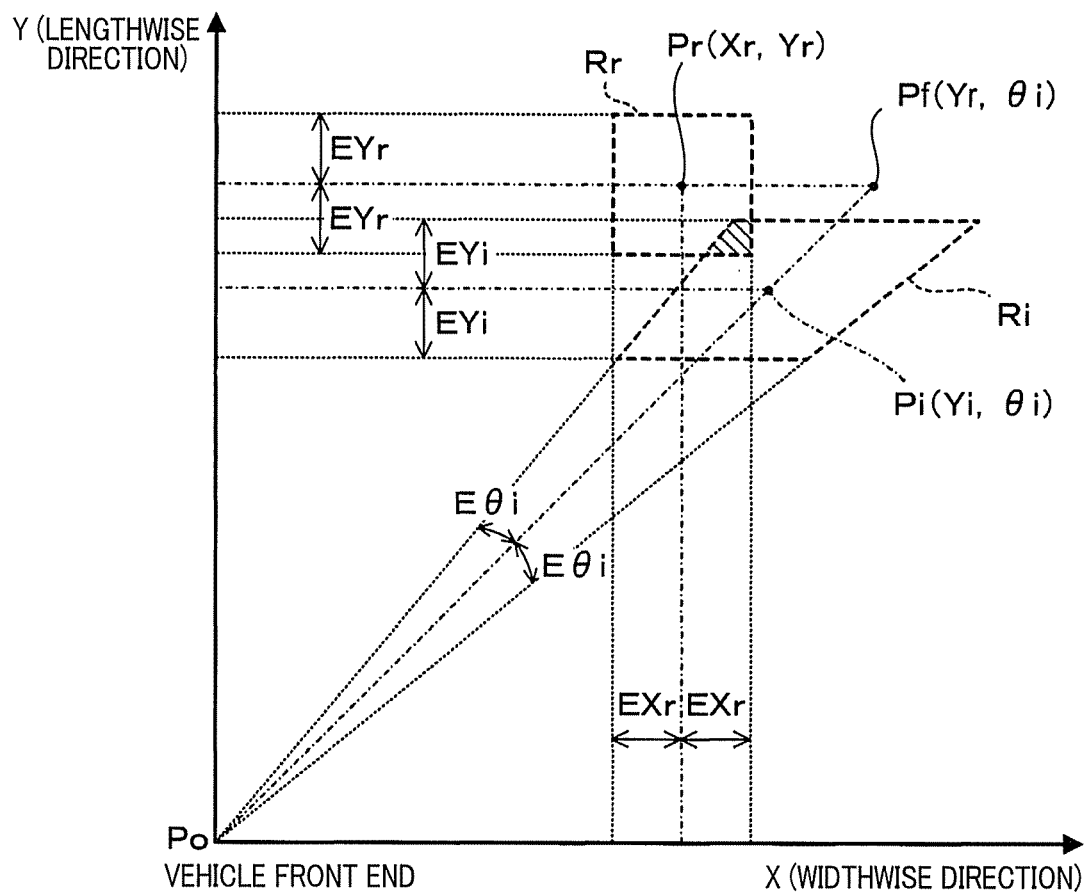
FIG. 3 shows error domains defined in the first embodiment.

First, in step S11, the collision mitigation ECU 7 detects an object on the basis of a radar signal transmitted from the millimeter-wave radar 2 (i.e., detection information from the millimeter-wave radar 2). More specifically, on the basis of the radar signal, the collision mitigation ECU 7 calculates or determines a linear distance from the subject vehicle to the object and a horizontal azimuth angle of the object (i.e., an angular position of the object from the forward direction of the subject vehicle). On the basis these calculated values, the collision mitigation ECU 7, as shown in FIG. 3, calculates or determines position coordinates (X- and Y-coordinates) of the object on the XY-plane as a detection point Pr of the object on the XY-plane. The X-axis of the XY-plane is defined by a vehicle-widthwise direction (transverse direction) of the subject vehicle, and the Y-axis of the XY-plane is defined by a vehicle-lengthwise direction (forward direction) of the subject vehicle. A reference point Po of the XY-plane is set at a nose (or front end) of the subject vehicle, on which the millimeter-wave radar 2 is mounted. The detection point Pr is a position of the object relative to the reference point Po. It should be noted that FIG. 3 shows an example of object located forward of and to the right of the subject vehicle. Additionally, in step S11, the collision mitigation ECU 7 may calculate, in addition to the detection point Pr of the object, a speed of the object relative to the subject vehicle. In the following, the object detected in step S11 will be referred to as a "radar object."

Subsequently, in step S12, the collision mitigation ECU 7 defines an error domain Rr centered at the detection point Pr detected in step S11, as shown in FIG. 3. More specifically, an X-coordinate range of the error domain Rr, centered at the X-coordinate of the detection point Pr, and a Y-coordinate range of the error domain Rr, centered at the Y-coordinate of the detection point Pr, are assumed errors in the X- and Y-coordinates, respectively, which are predetermined on the basis of the characteristics of the millimeter-wave radar 2.

The error domain Rr can be expressed by $Xr-EXr \leq X \leq Xr+EXr$ and $Yr-EYr \leq Y \leq Yr+EYr$, where Xr, Yr are the X- and Y-coordinates of the detection point Pr, respectively, and $\pm EXr$, $\pm EYr$ are assumed errors in the X- and Y-coordinates, respectively.

Figure 4:
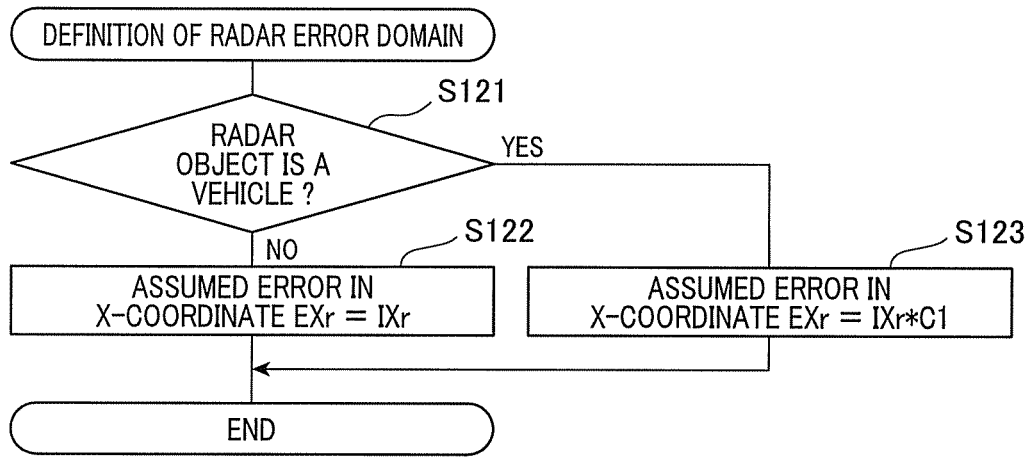
FIG. 4 shows a flowchart of a process of defining a radar error domain of the first embodiment.

The collision mitigation ECU 7 changes the assumed error EXr according to a radar object type, such as a vehicle, a pedestrian, or the like. More specifically, FIG. 4 shows a process performed in step S12. The collision mitigation ECU 7, in step S121, determines whether or not the radar object is a vehicle. If it is determined in step S121 that the radar object is not a vehicle (but, a pedestrian or the like), the collision mitigation ECU 7 sets the assumed error EXr to a default value IXr in step S122. If it is determined in step S121 that the radar object is a vehicle, then the collision mitigation ECU 7 sets the assumed error EXr to the default value IXr multiplied by a constant C1 (greater than one) in step S123.

When it is determined by the collision mitigation ECU 7 that, the radar object is a vehicle, the assumed error EXr is increased (i.e., the error domain Rr is extended in the X-direction with the height being kept constant) as compared to when it is determined by the collision mitigation ECU 7 that the radar object is a pedestrian. This comes from the fact that a lateral range of spots of a vehicle from which the millimeter waves can be reflected is greater than a lateral range of spots of a pedestrian from which the millimeter waves can be reflected.

It should be noted that, since whether or not the radar object detected in step S11 is actually a vehicle cannot be determined yet at this stage, it is assumed in step S121 that the radar object is of the radar object type determined in the precious cycle. In the following, the error domain Rr defined in step S12 (i.e., the error domain Rr defined for the detection point Pr of the radar object on the basis of characteristics of the millimeter-wave radar 2) is referred to as a "radar error domain Rr."

Subsequently, in step S13, the collision mitigation ECU 7 detects an object on the basis of an image signal transmitted from the monocular camera 3 (i.e., a captured image from the monocular camera 3). More specifically, the collision mitigation ECU 7 applies image analysis to the captured image represented by the image signal to identify an object. This identification may be implemented by matching processing with preregistered object models. An object model is prepared for each object type, such as a vehicle, a pedestrian, or the like, which allows not only determination of the presence of an object, but also identification of its object type. The collision mitigation ECU 7 determines a Y-coordinate of the object on the XY-plane on the basis of a vertical position of the object in the captured image, and a horizontal azimuth angle of the object (an angular position from the forward direction of the subject vehicle) on the basis of a horizontal position of the object in the capture image.

As the object is located more distant from the subject vehicle in the forward direction of the subject vehicle, that is, as the Y-coordinate of the object is increased, a lower end of the object tends to be located at a higher position in the captured image. This allows the Y-coordinate of the object to be determined on the basis of the height of the lower end position of the object in the captured image. In such a specific manner, however, inaccurate detection of the lower end position of the object will leads to lower accuracy of detecting the Y-coordinate of the object.

In addition, a horizontal displacement of the object from the focus of expansion (FOE) of the monocular camera 3 tends to increase with an increasing angular displacement of the object from the forward direction of the subject vehicle (specifically, a line of X=0). This allows a horizontal azimuth angle of the object to be determined on the basis of a distance from the FOE to a vertical line passing through the center of the object.

As such, in step S13, the collision mitigation ECU 7 determines the Y-coordinate and the horizontal azimuth angle (angular position) of the object on the XY-plane as the detection point Pi of the object on the XY-plane, as shown in FIG. 3. The detection point Pi of the object represents a position of the object relative to the reference point Po. In the following, the object detected in step S13 (the object detected on the basis of the captured image from the monocular camera 3) will be referred to as an "image object."

Subsequently, in step S14, the collision mitigation ECU 7 defines an error domain Ri centered at the detection point Pi of the image object calculated in step S13, as shown in FIG. 3. More specifically, a Y-coordinate (vertical) range of the error domain Ri, centered at the Y-coordinate of the detection point Pi, and a horizontal azimuth angle range of the error domain Ri (hereinafter referred to as an "image azimuth angle range"), centered at the horizontal azimuth angle of the detection point Pi, are assumed errors in the Y-coordinate and the horizontal azimuth angle, respectively, which are predetermined on the basis of the characteristics of the millimeter-wave radar 3.

The error domain Ri can be expressed by $Yi-EYi \leq Y \leq Yi+EYi$ and $\theta i - E\theta i \leq \theta \leq \theta i + E\theta i$, where $Yi$, $\theta i$ are the Y-coordinate and the horizontal azimuth angle of the detection point Pr, respectively, and $\pm EYi$, $\pm E\theta i$ are assumed errors in the Y-coordinate and the horizontal azimuth angle, respectively. That is, the image azimuth angle range of the error domain Ri is $2E\theta i$ in width and the Y-coordinate range of the error domain Ri is $2EYi$ in width.

Figure 5:
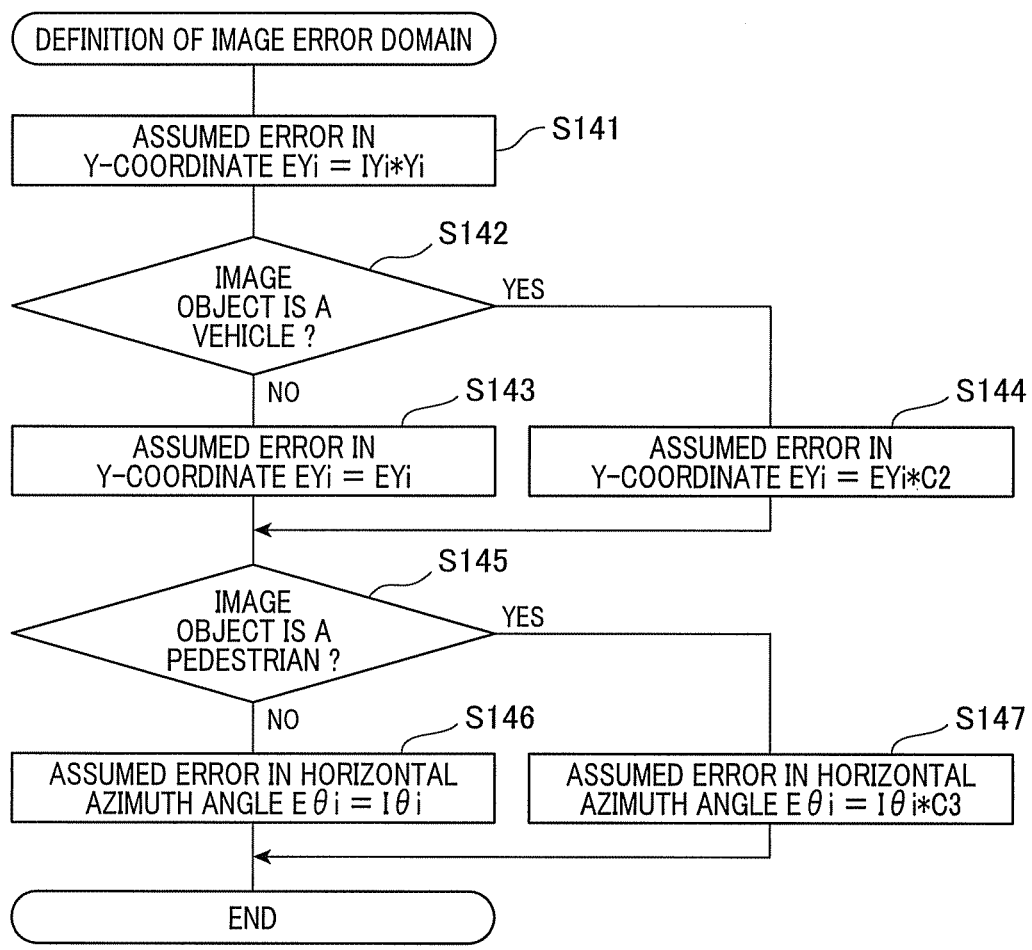
FIG. 5 shows a flowchart of a process of defining an image error domain of the first embodiment.

The collision mitigation ECU 7 changes the assumed error EYi in the Y-coordinate and the assumed error E$\theta$i in the horizontal azimuth angle according to a type and a position of the image object. More specifically, FIG. 5 shows a process performed in step S14. The collision mitigation ECU 7, in step S141, sets the assumed error EYi in the Y-coordinate to a default value IYi multiplied by the Y-coordinate Yi of the image object. That is, the assumed error EYi in the Y-coordinate is increased with an increasing Y-coordinate of the detection point Pi of the image object. In the present embodiment, the assumed error EYi in the Y-coordinate is proportional to the Y-coordinate of the detection point Pi of the image object. This comes from the fact that, as the object is located more distant from the subject vehicle in the forward direction of the subject vehicle, that is, as the Y-coordinate of the object is increased, an error in the lower end position of the image object in the captured image increases.

Subsequently, in step S142, the collision mitigation ECU 7 determines whether or not the image object is a vehicle. If it is determined in step S142 that the image object is not a vehicle (but, for example, a pedestrian or the like), then the collision mitigation ECU 7 leaves the assumed error EYi unchanged in step S143. If it is determined in step S142 that the image object is a vehicle, then the collision mitigation ECU 7 multiplies the assumed error EYi by a constant C2 (greater than one) in step S144. That is, if it is determined that the image object is a vehicle, then the assumed error EYi is increased as compared to when it is determined that the image object is not a vehicle. This comes from the fact that, when the object is a vehicle, tires are likely to be shadowed by a vehicle body, and the lower end position of the object may therefore be determined less accurately, that is, the Y-coordinate of the object may be determined less accurately, as compared to when the object is not a vehicle.

Subsequently, in step S145, the collision mitigation ECU 7 determines whether or not the image object is a pedestrian. If it is determined in step S145 that the image object is not a pedestrian (but a vehicle or the like), then the collision mitigation ECU 7 sets the assumed error E$\theta$i to a default value I$\theta$i in step S146. If it is determined in step S145 that the image object is a pedestrian, then the collision mitigation ECU 7 multiplies the default value E$\theta$i by a constant C3 (greater than one) in step S147. That is, if it is determined that the image object is a pedestrian, then the assumed error E$\theta$i is increased as compared to when it is determined that the image object is a vehicle. This comes from the fact that, since the pedestrian detected in front of the subject vehicle is likely to be a pedestrian crossing a crosswalk, the horizontal position of the pedestrian may therefore be determined less accurately as compared to when it is determined that the image object is a vehicle.

In the following, the error domain Ri defined in step S14 (i.e., the error domain Ri defined for detection point Pi of the image object on the basis of characteristics of the monocular camera 3) is referred to as an "image error domain Ri."

Subsequently, in step S15, the collision mitigation ECU 7 determines whether or not an overlapping domain of the radar error domain Rr and the image error domain Ri is present.

If it is determined in step S15 that there exists an overlapping domain of the radar error domain Rr and the image error domain Ri (a shaded domain in FIG. 3), then the collision mitigation ECU 7 determines that the radar object and the image object are the same in step S16. A position of the object determined the same on the XY-plane is a position Pf specified by the Y-coordinate Yr of the detection point Pr of the radar object and the horizontal azimuth angle θi of the image object.

Further, in step S17, the collision mitigation ECU 7 calculates a degree of confidence in determination that the radar object and the image object are the same. In the present embodiment, the degree of confidence is defined by an angle difference between the horizontal azimuth angle of the detection point Pr of the radar object and the horizontal azimuth angle of the detection point Pi of the image object. Such a degree of confidence increases with a decreasing angle difference.

If it is determined in step S15 that there exists no overlapping domain of the radar error domain Rr and the image error domain Ri, then the collision mitigation ECU 7 determines that the radar object and the image object are not the same, that is, they are different objects.

Subsequently, the collision mitigation ECU 7 performs collision mitigation control according to the position Pf of the object and the degree of confidence calculated in step S17. For example, when the subject vehicle is likely to collide with the object, the collision mitigation ECU 7 transmits a warning signal to an alert unit 6 to alert the driver. When the subject vehicle is more likely to collide with the object, the collision mitigation ECU 7 instructs the engine ECU 5 to decrease a driving force of an internal-combustion engine and/or instructs the brake ECU 4 to increase a braking force of the subject vehicle. In addition, the collision mitigation ECU 7 changes control aspects according to a degree of confidence. For example, for a high degree of confidence, a control initiation timing is advanced as compared to a control initiation timing for a low degree of confidence.

The first embodiment can provide the following benefits.

(1) In the present embodiment, the X-coordinate range of the image error domain Ri is an image azimuth angle range centered at the horizontal azimuth angle θi of the object detected on the basis of the captured image (image object), which can prevent false determinations. This comes from the fact that accuracy of detecting the horizontal azimuth angle of the image object on the basis of the captured image from the monocular camera 3 is relatively high as compared to accuracy of detecting the Y-coordinate of position of the image object. Therefore, not the X-coordinate range, but the image azimuth angle range of the image error domain Ri is set to be constant in width. This leads to the image error domain Ri being suited for characteristics of the monocular camera 3, which can prevent false determinations.

(2) In the present embodiment, when it is determined that the radar object is a vehicle, the X-coordinate range of the radar error domain Rr is increased as compared to when it is determined that the radar object is a pedestrian (see steps S121-S123 in FIG. 4). This leads to the radar error domain Rr being suited for characteristics of a vehicle having a laterally greater range of spots from which millimeter waves can be reflected than a pedestrian, which can prevent false determinations.

(3) In the present embodiment, the Y-coordinate range of the image error domain Ri is increased with an increasing Y-coordinate of the detection point Pi of the image object (see step S141 in FIG. 5). This leads to the image error domain Ri being suited for characteristics such that an error in the lower end position of the image object in the captured image increases with an increasing Y-coordinate of the object, which can prevent false determinations.

(4) In the present embodiment, when it is determined that the image object is a vehicle, the Y-coordinate range of the image error domain Ri is increased as compared to when it is determined that the image object is a pedestrian (see steps S142-S144 in FIG. 5). This leads to the image error domain Ri being suited for characteristics such that a lower end position of a vehicle is unable to be detected accurately, which can prevent false determinations.

(5) In the present embodiment, when it is determined that the image object is a pedestrian, the image azimuth angle range of the image error domain Ri is increased as compared to when it is determined that the image object is a vehicle (see steps S142-S144 in FIG. 5). This leads to the image error domain Ri being suited for the characteristics of a pedestrian moving laterally (i.e., moving in the X-direction), thereby preventing false determinations.

(6) In the present embodiment, when it is determined that the radar object and the image object are the same, a position of the object on the XY-plane is defined by the Y-coordinate of the detection point Pr of the radar object and the horizontal azimuth angle θi of the image object. This allows a position of the object to be determined accurately by utilizing characteristics of each of the millimeter-wave radar 2 and the monocular camera 3.

(7) In the present embodiment, when it is determined that the radar object and the image object are the same, a degree of confidence in determination that the radar object and the image object are the same is calculated. This allows vehicle control aspects to be changed according to the calculated degree of confidence even when it is determined that the radar object and the image object are the same. More specifically, the degree of confidence is defined by a angle difference between the horizontal azimuth angle of the detection point Pr of the radar object and the horizontal azimuth angle of the detection point Pi of the image object. Such a degree of confidence increases with a decreasing angle difference. This definition can facilitate the calculation of the degree of confidence.

Figure 1B:
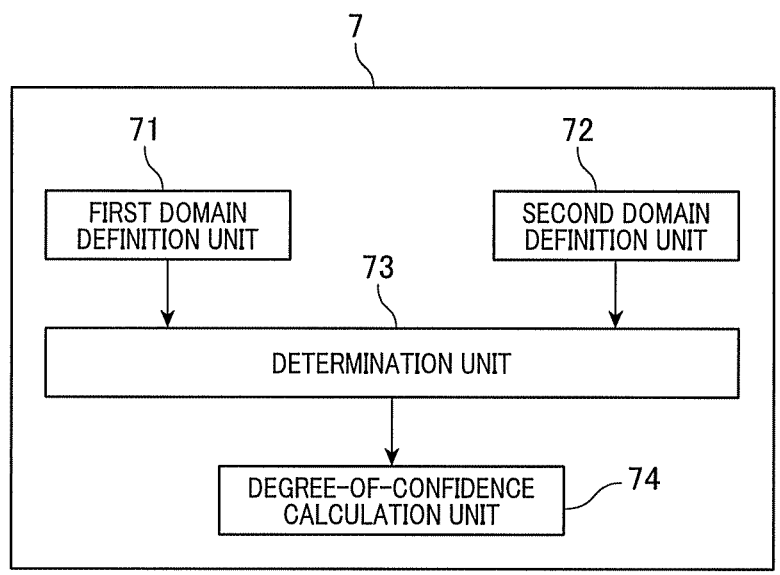
FIG. 1B shows a schematic block diagram of a collision mitigation ECU of the first embodiment.

Referring to FIG. 1B, the collision mitigation ECU 7, which serves as an object detection apparatus, includes a first domain definition unit 71 responsible for execution of steps S11-S12, a second domain definition unit 72 responsible for execution of steps S13-S14, and a determination unit 73 responsible for execution of steps S15-S16. The collision mitigation ECU 7 further includes a degree-of-confidence calculation unit 74 responsible for execution of step S17. These units 71-74 may be implemented by the collision mitigation ECU 7 executing suitable computer programs stored in the ROM or the like such as to act in accordance with the processes explained in connection with embodiments of the invention.

The radar object corresponds to a first object. The image object corresponds to a second object. The detection point Pr corresponds to a first detection point. The detection point Pi corresponds to a second detection point. The radar error domain Rr corresponds to a first object domain. The image error domain Ri corresponds to a second object domain. The image azimuth angle range corresponds to a second azimuthal range.

(Second Embodiment)

There will now be explained a second embodiment of the present invention. Only differences of the second embodiment from the first embodiment will be explained.

In the first embodiment described above, the radar error domain Rr is defined by an X-coordinate range of assumed error in the X-coordinate, centered at the X-coordinate of the detection point Pr, and a Y-coordinate range of assumed error in the Y-coordinate, centered at the Y-coordinate of the detection point Pr, where the assumed errors in the X- and Y-coordinates are predetermined on the basis of the characteristics of the millimeter-wave radar 2.

Alternatively, in the present embodiment, a radar error domain Rr is defined by a horizontal azimuth angle range of assumed error in the horizontal azimuth angle, centered at the horizontal azimuth angle of the detection point Pr, and a Y-coordinate range of assumed error in the Y-coordinate, centered at the Y-coordinate of the detection point Pr, where the assumed errors in the horizontal azimuth angle and the Y-coordinate are predetermined on the basis of the characteristics of the millimeter-wave radar 2.

The radar error domain Rr can be expressed by $Yr-EYr \le Y \le Yr+EYr$ and $\theta r-E\theta r \le \theta \le \theta r+E\theta r$, where Yr, $\theta r$ are the Y-coordinate and the horizontal azimuth angle of the detection point Pr, respectively, and $\pm EYr$, $\pm \theta r$ are assumed errors in the Y-coordinate and the horizontal azimuth angle, respectively. That is, the horizontal azimuth angle range of the error domain Rr, centered at the horizontal azimuth angle of the detection point Pr, is $2E\theta r$ in width (hereinafter referred to as a "radar azimuth angle range") and the Y-coordinate range of the radar error domain Rr, centered at the Y-coordinate of the detection point Pr, is 2EYr in width.

With this configuration, the present embodiment can provide similar benefits as in the first embodiment. In addition, in the present embodiment, the radar error domain Rr is defined on the basis of more characteristics of the millimeter-wave radar 2, which may prevent false determinations. The radar azimuth angle range corresponds to a first azimuthal range.

(Third Embodiment)

There will now be explained a third embodiment of the present invention. Only differences of the third embodiment from the second embodiment will be explained.

Figure 6:
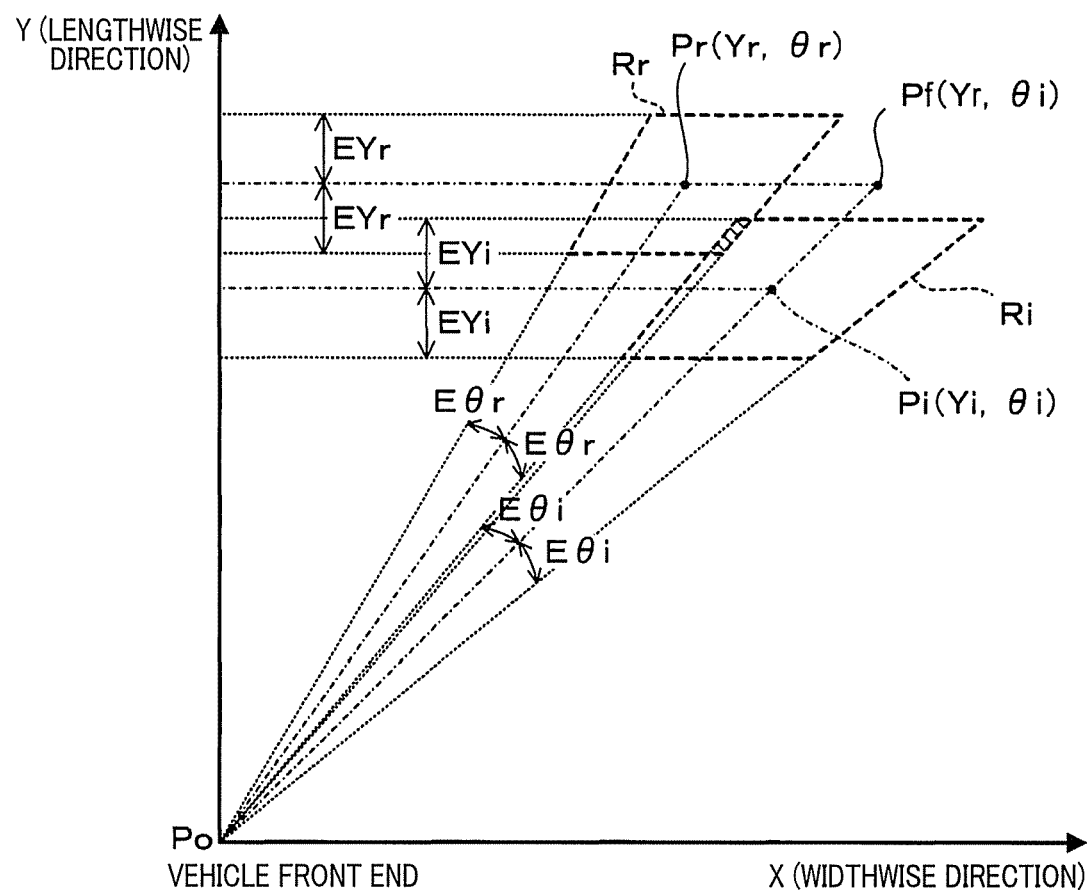
FIG. 6 shows error domains defined in a second embodiment.
Figure 7:
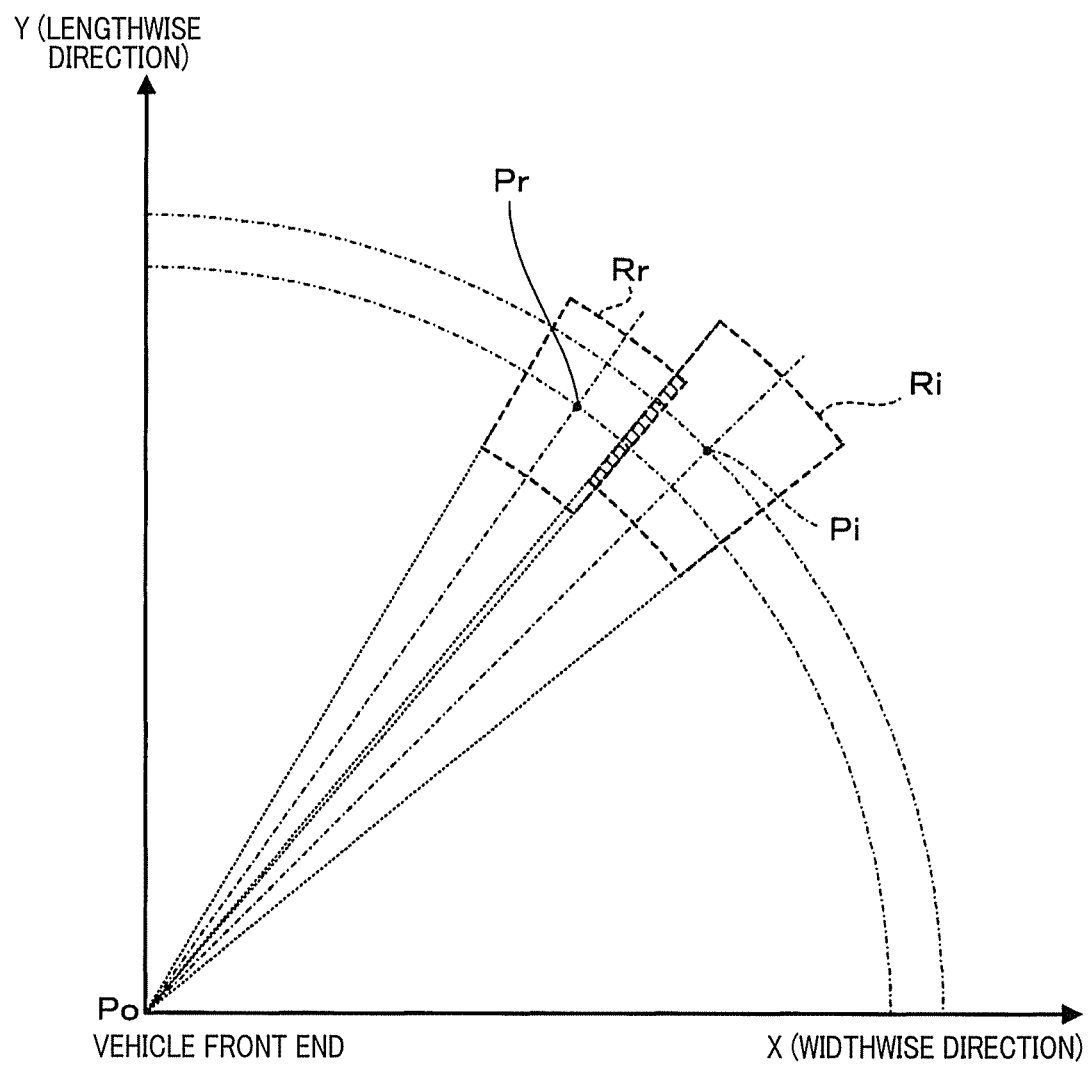
FIG. 7 shows error domains defined in a third embodiment.

In the second embodiment, as described above, the radar error domain Rr and the image error domain Ri are defined in a similar manner to each other. As shown in FIG. 6, the radar error domain Rr is defined by a horizontal azimuth angle range of assumed error in the horizontal azimuth angle, centered at the horizontal azimuth angle of the detection point Pr, and a Y-coordinate range of assumed error in the Y-coordinate, centered at the Y-coordinate of the detection point Pr. Similarly, the image error domain Ri is defined by a horizontal azimuth angle range of assumed error in the horizontal azimuth angle, centered at the horizontal azimuth angle of the detection point Pi, and a Y-coordinate range of assumed error in the Y-coordinate, centered at the Y-coordinate of the detection point Pi.

Alternatively, in the third embodiment, the radar error domain Rr and the image error domain Ri are defined in a similar manner to each other as follows. The position of the detection point Pr is specified by a linear distance r1 from the reference point Po to the detection point Pr (also referred to as a radial coordinate) and the horizontal azimuth angle of the detection point Pr as defined in the first and second embodiments.

Figure 8:
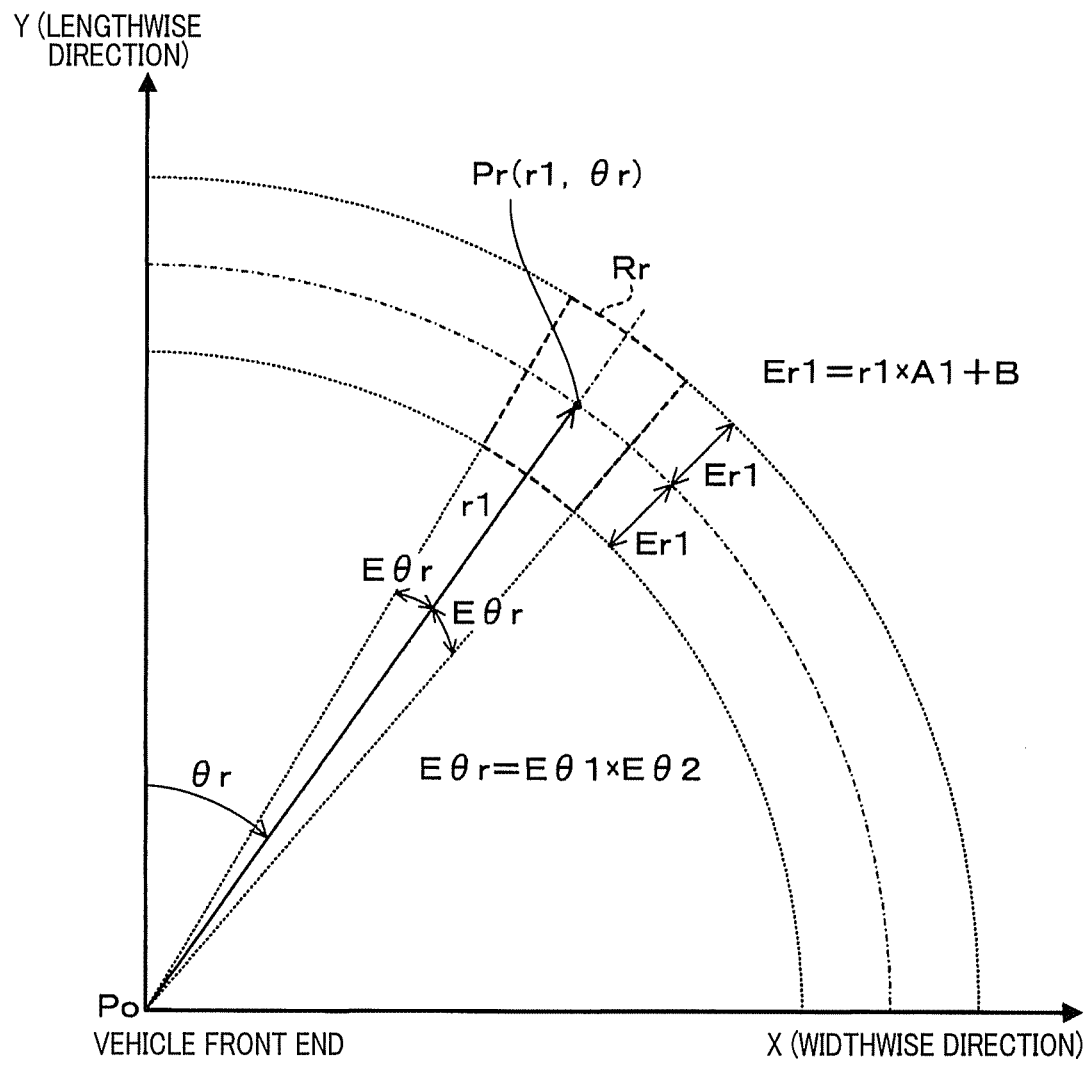
FIG. 8 shows a radar error domain defined in the third embodiment.

In the present embodiment, as shown in FIG. 8, the radar error domain Rr is defined by a horizontal azimuth angle range of assumed error in the horizontal azimuth angle, centered at the horizontal azimuth angle of the detection point Pr, and a linear distance range of assumed error in the linear distance, centered at the linear distance of the detection point Pr, where the assumed errors in the horizontal azimuth angle and the linear distance are predetermined on the basis of the characteristics of the millimeter-wave radar 2. The radar error domain Rr can be expressed by $r1-Er1 \le r \le r1+Er1$ and $\theta r-E\theta r \le \theta \le \theta r+E\theta r$, where r1, $\theta r$ are the linear distance and the horizontal azimuth angle of the detection point Pr, respectively, and $\pm Er1$, $\pm \theta r$ are assumed errors in the linear distance and the horizontal azimuth angle, respectively. That is, the radar error domain Rr is defined by the horizontal azimuth angle range of $\theta r-E\theta r$ to $\theta r+E\theta r$, centered at the horizontal azimuth angle of the detection point Pr (radar azimuth angle range) and the linear distance range of $r1-Er1$ to $r1+Er1$, centered at the linear distance of the detection point Pr (hereinafter referred to as a "radar distance range").

Figure 9A:
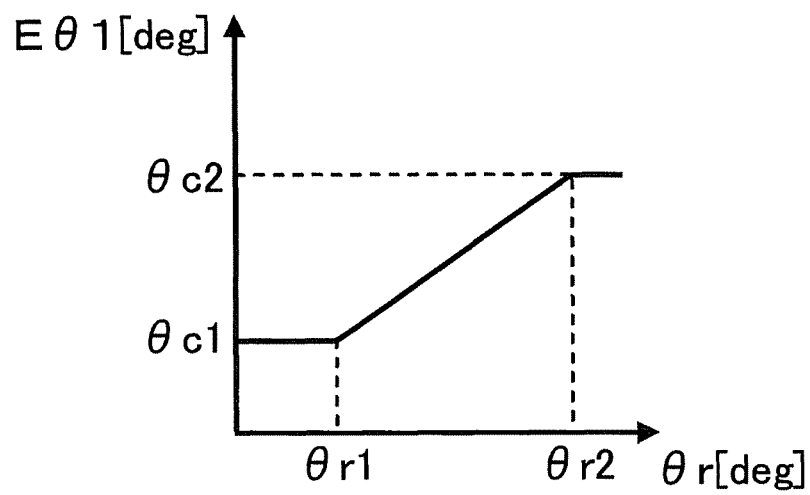
FIG. 9A shows a relation between $\theta r$ and $R\theta 1$.

The assumed error $E\theta r$ in the horizontal azimuth angle $\theta r$ of the detection point Pr of the radar object is calculated as a product of $E\theta 1$ and $E\theta 2$ (i.e., $E\theta r = E\theta 1 \times E\theta 2$). As shown in FIG. 9A, $E\theta 1$ is set to a lower limit $\theta c1$ [deg] for the horizontal azimuth angle $\theta r$ equal to or less than $\theta r1$ [deg], increased with an increasing horizontal azimuth angle $\theta r$ from $\theta r1$ [deg] to $\theta r2$ [deg] ($\theta r2 > \theta r1$) where $E\theta 1 - \theta c1$ is proportional to $\theta r - \theta r1$, and set to an upper limit $\theta c2$ [deg] for the horizontal azimuth angle $\theta r$ equal to or greater than $\theta r2$ [deg].

With the assumed error $E\theta r$ using such $E\theta 1$, when the horizontal azimuth angle $\theta r$ is greater than $\theta r1$ [deg], the assumed error $E\theta r$ is increased as compared to when the horizontal azimuth angle $\theta r$ is equal to or less than $\theta r1$ [deg]. This leads to the assumed error $E\theta r$ reflecting the characteristics of the millimeter-wave radar 2 such that a detection error is increased with an increasing horizontal azimuth angle $\theta r$, that is, the antenna gain decreases.

Figure 9B:
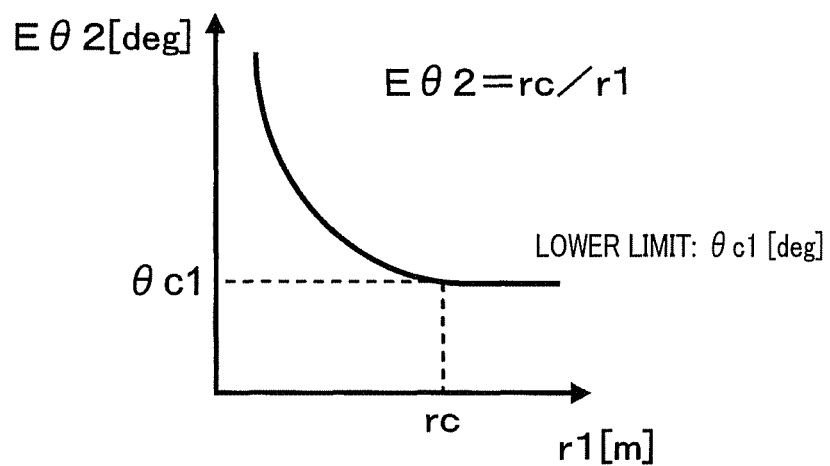
FIG. 9B shows a relation between $r1$ and $E\theta 2$.

In addition, as shown in FIG. 9B, $E\theta 2$ is set to be inversely proportional to the linear distance r1 from the reference point Po to the radar object, i.e., $E\theta 2 = rc/r1$, where rc is a constant. For the linear distance r1 equal to or greater than rc [m], $E\theta 2$ is set to the lower limit value $\theta c1$ [deg].

With this definition of the assumed error $E\theta r$ calculated as $E\theta 2$ multiplied by $E\theta 1$, when the linear distance r1 is less than the predetermined value rc [m], the assumed error $E\theta r$ in the horizontal azimuth angle is increased as compared to when the linear distance r1 is equal to or greater than the predetermined value rc [m]. If $E\theta r$ was constant over linear distance from the reference point Po to the detection point Pr, the radar error domain Rr would be so narrow (particularly, in the X axis direction) for short linear distances such that an overlapping domain between the radar error domain Rr and the image error domain Ri is unlikely to be present, which would lead to false determinations that the radar object and the image object are different objects although they are actually the same. So, in the present embodiment, the assumed error $E\theta r$ is increased with a decreasing linear distance from the reference point Po to the detection point Pr, which can prevent the assumed error $E\theta r$ from becoming too small. In the present embodiment, the upper limit of the assumed error $E\theta r$ is set to $\theta c3$ [deg] ($\theta c3 > \theta c2$), and the lower limit of the assumed error $E\theta r$ is set to $\theta c1$ [deg].

The assumed error Er1 in the linear distance is calculated as, for example, $Er1 = r1 \times A1 + B$, where A1, B are constants. That is, the assumed error Er1 is increased with an increasing linear distance r1 from the reference point Po to the detection point Pr of the radar object. This leads to the assumed error Er1 reflecting the characteristics of the millimeter-wave radar 2 such that a detection error in the linear distance is increased with an increasing linear distance r1.

Figure 10:
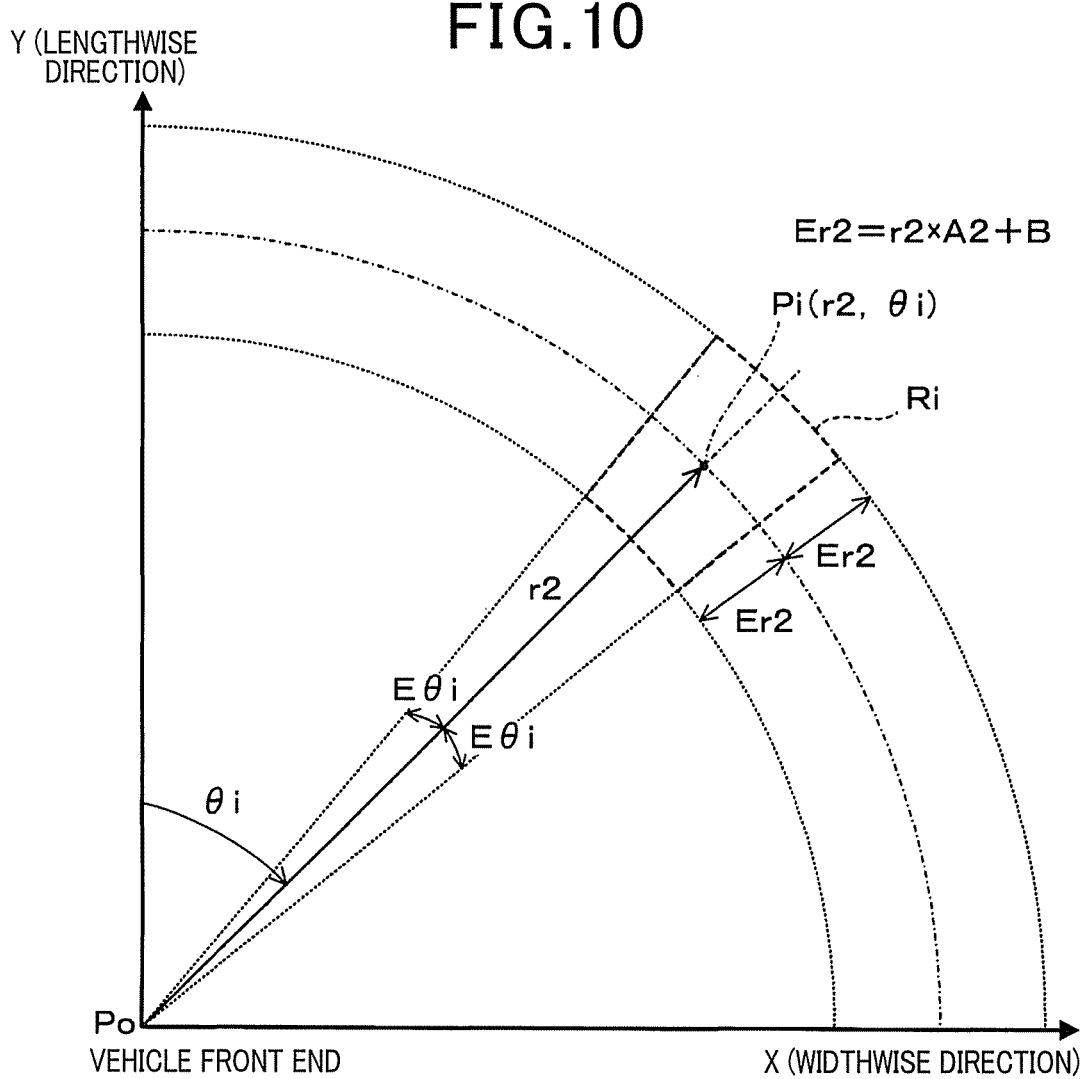
FIG. 10 shows an image error domain defined in the third embodiment.

In addition, as shown in FIG. 10, the image error domain Ri is defined by a horizontal azimuth angle range of assumed error in the horizontal azimuth angle, centered at the horizontal azimuth angle $\theta i$ of the detection point Pi of the image object and a linear distance range of assumed error in the linear distance, centered at the linear distance r2 of the detection point Pi, where the assumed errors in the horizontal azimuth angle and the linear distance are predetermined on the basis of the characteristics of the monocular camera 3. The image error domain Ri can be expressed by $r2-Er2 \leq r \leq r2+Er2$ and $\theta i-E\theta i \leq \theta \leq \theta i+E\theta i$, where r2, $\theta i$ are the linear distance and the horizontal azimuth angle of the detection point Pi, respectively, and $\pm Er2$, $\pm \theta i$ are assumed errors in the linear distance and the horizontal azimuth angle, respectively. That is, the image error domain Ri is defined by the horizontal azimuth angle range of $\theta i-E\theta i$ to $\theta i+E\theta i$, centered at the horizontal azimuth angle $\theta i$ of the detection point Pi (image azimuth angle range) and the linear distance range of $r2-Er2$ to $r2+Er2$, centered at the linear distance r2 of the detection point Pi (hereinafter referred to as a "image distance range").

Figure 11:
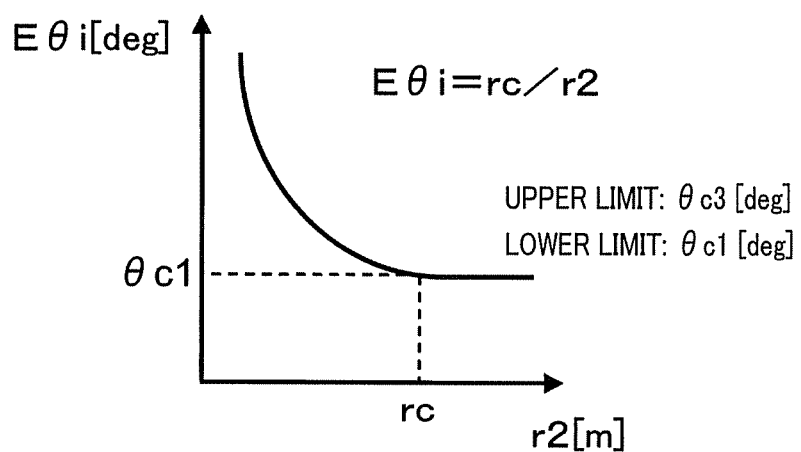
FIG. 11 shows a relation between $r2$ and $E\theta i$.

The assumed error $E\theta i$ in the horizontal azimuth angle $\theta i$ of the detection point Pi of the image object is defined in a similar manner to the assumed error $E\theta 2$. As shown in FIG. 11, $E\theta i$ is set to be inversely proportional to the linear distance r2 from the reference point Po to the detection point Pi of the image object, i.e., $E\theta i=rc/r2$. For the linear distance r2 equal to or greater than rc [m], $E\theta i$ is set to the lower limit $\theta c1$ [deg].

With this definition, when the linear distance r2 from the reference point Po to the detection point Pi of the image object is less than the predetermined value rc [m], the assumed error $E\theta 1$ in the horizontal azimuth angle is increased as compared to when the linear distance r2 is equal to or greater than the predetermined value rc [m]. In the present embodiment, the upper limit of $E\theta i$ is set to $\theta c3$ [deg]. Being defined without multiplication by $E\theta 1$, the image azimuthal range is reduced in width as compared to the radar azimuthal range. Accuracy of detecting the horizontal azimuth angle $\theta i$ on the basis of the captured image is unlikely to be affected by the horizontal azimuth angle $\theta i$ itself as compared to the horizontal azimuth angle $\theta r$.

The assumed error Er2 in the linear distance r2 is calculated as, for example, $Er2=r2 \times A2+B$, where A2 (>A1), B are constants. That is, the assumed error Er2 is increased with an increasing linear distance r2 from the reference point Po to the detection point Pi of the image radar object. The increasing rate A2 of the assumed error Er2 is greater than the increasing rate A1 of the assumed error Er1. This leads to the assumed error Er2 reflecting the characteristics of the monocular camera 3 such that the detection error in the linear distance r2 determined by using the monocular camera 3 is greater than the detection error in the linear distance r1 determined by millimeter-wave radar 2 and the detection error in the linear distance r2 is increased with an increasing linear distance r2.

With this configuration, the present embodiment can provide similar benefits as in the second embodiment. The present embodiment can provide the following additional benefits.

(1) In the present embodiment, the image error domain Ri is defined by the image azimuthal range of assumed error and the image distance range of assumed error. This leads to the image error domain Ri reflecting detection errors more properly as compared to the image error domain defined by using the Y-coordinate range of assumed error instead of the image distance range of assumed error.

(2) In the present embodiment, the image distance range of assumed error is increased with as increasing linear distance r2 from the reference point Po to the detection point of the image object. This leads to the image error domain Ri being more suited for the characteristics of the monocular camera 3.

(3) In the present embodiment, when the linear distance r2 from the reference point Po to the detection point of the image object is less than the predetermined value rc, the image azimuthal range of assumed error is increased as compared to when the linear distance r2 is equal to or greater than the predetermined value rc. This can prevent false determinations of the presence of objects close to the subject vehicle.

(4) In the present embodiment, the radar error domain Rr is defined by the radar azimuthal range of assumed error and the radar distance range of assumed error. This leads to the radar error domain Rr reflecting detection errors more properly as compared to the radar error domain defined by using the Y-coordinate range of assumed error instead of the radar distance range of assumed error.

(5) In the present embodiment, the radar distance range of assumed error is increased with an increasing linear distance r1 from the reference point Po to the detection point of the radar object. This leads to the radar error domain Rr being more suited for the characteristics of the millimeter-wave radar 2.

(6) In the present embodiment, when the linear distance r1 from the reference point Po to the detection point of the radar object is less than the predetermined value rc, the radar azimuthal range of assumed error is increased as compared to when the linear distance r1 is equal to or greater than the predetermined value. This leads to the radar error domain Rr being more suited for the characteristics of the millimeter-wave radar 2.

(7) In the present embodiment, when the horizontal azimuth angle $\theta r$ is greater than the predetermined value $\theta r1$, the radar azimuthal range of assumed error is increased as compared to when the horizontal azimuth angle $\theta r$ is equal to or less than the predetermined value $\theta r1$. This leads to the radar error domain Rr being more suited for the characteristics of the millimeter-wave radar 2.

(8) In the present embodiment, the radar distance range of assumed error is narrowed as compared to the image distance range of assumed error. This leads to the radar error domain Rr and the image error domain Ri more properly reflecting differences in characteristics between the millimeter-wave radar 2 and the monocular camera 3.

(9) In the present embodiment, the image azimuthal range of assumed error is narrowed as compared to the radar azimuth range of assumed error. This leads to the radar error domain Rr and the image error domain Ri more properly reflecting differences in characteristics between the millimeter-wave radar 2 and the monocular camera 3.

In the present embodiment, as in the first or second embodiment, a position of the object determined the same on the XY-plane may be a position Pf specified by the Y-coordinate Yr of the detection point Pr of the radar object and the horizontal azimuth angle $\theta i$ of the image object. Alternatively, the linear distance r1 may be used in place of the Y-coordinate Yr. That is, a position of the object determined the same on the XY-plane may be set to a position specified by the radial coordinate of the detection point Pr of the radar object and the horizontal azimuth angle θi of the image object.

The radar distance range corresponds to a first linear distance range. The image distance range corresponds to a second linear distance range.

(Fourth Embodiment)

There will now be explained a fourth embodiment of the present invention. Only differences of the fourth embodiment from the first embodiment will be explained.

In the first embodiment described above, the radar error domain Rr is defined with reference to the detection point Pr of the radar object. If it is determined that an overlapping domain of the radar error domain Rr and the image error domain Ri is present, then it is determined that the radar object and the image object are the same.

Figure 12:
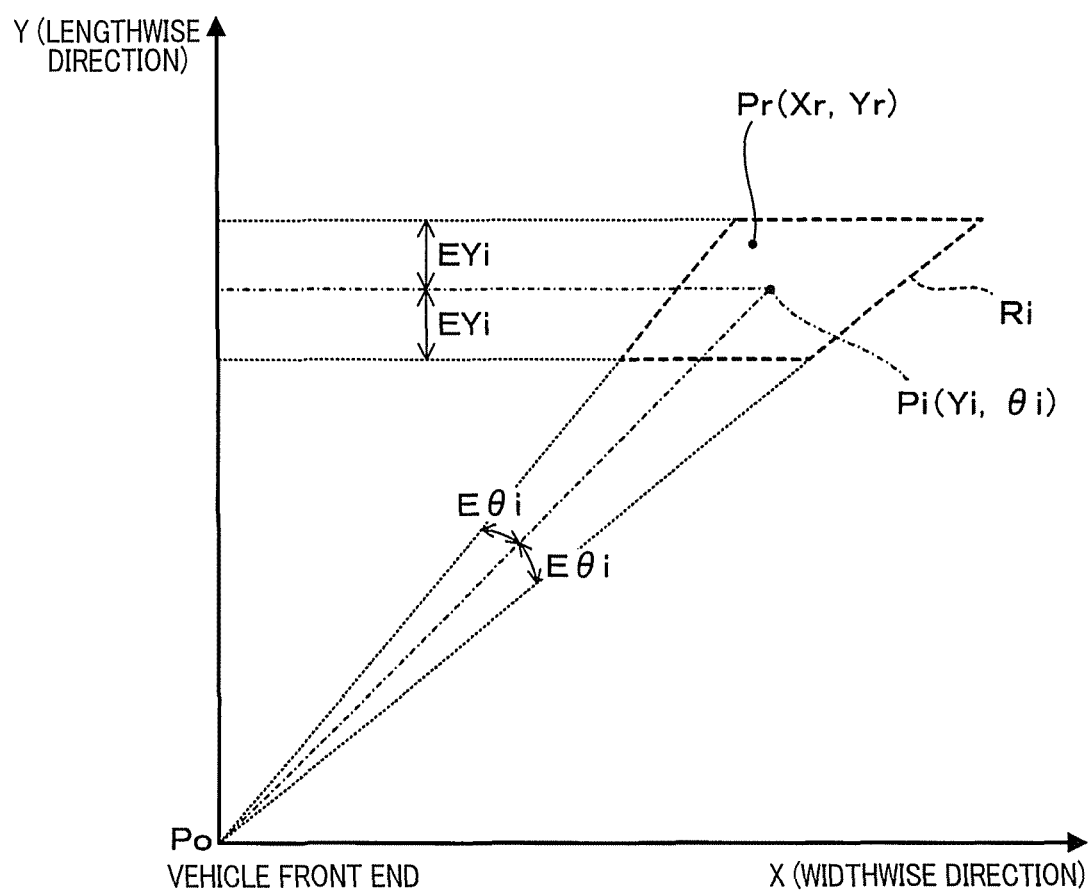
FIG. 12 shows error domains defined in a fourth embodiment.

Alternatively, in the present embodiment, as shown in FIG. 12, if it is determined that the detection point Pr of the radar object overlaps the image error domain Ri, that is, if it is determined that the detection point Pr of the radar object is present in the image error domain Ri, then it is determined that the radar object and the image object are the same. The present embodiment may be regarded as a limiting case of the first embodiment where the radar error domain Rr has shrinked to the detection point Pr.

The present embodiment can provide similar benefits as in the first embodiment. The present embodiment provides an additional benefit that the process in step S12 may be skipped.

The detection point Pr corresponds not only to the first detection point, but also to the first object domain. The present embodiment is applied to the first embodiment. Alternatively, the present embodiment may be applied to the second or third embodiment.

Fifth Embodiment)

There will now be explained a fifth embodiment of the present invention. Only differences of the fifth embodiment from the first embodiment will be explained.

In the first embodiment described above, when it is determined in step S145 that the image object is a pedestrian, the assumed error Eθi in the horizontal azimuth angle is set to a default value Iθi multiplied by a constant C3 in step S147. More specifically, in the first embodiment, the horizontal azimuth angle range is from θi−Eθi to θi+Eθi and centered at the horizontal azimuth angle θi of the detection point Pi (i.e., symmetrical about the horizontal azimuth angle θi).

Figure 13:
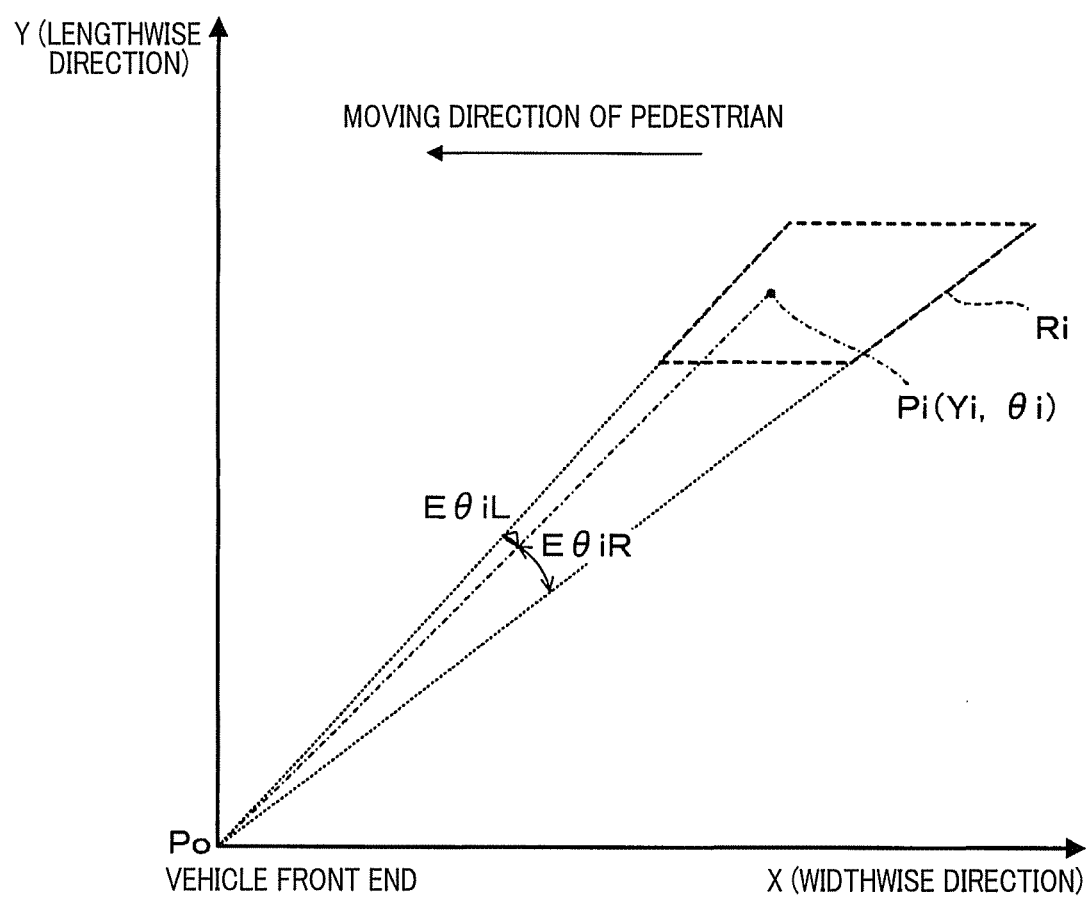
FIG. 13 shows an image error domain defined in a fifth embodiment.

Alternatively, in the present embodiment, as shown in FIG. 13, when it is determined that the image object is a pedestrian, the horizontal azimuth angle range may be asymmetrical about the horizontal azimuth angle θi, that is, includes left and right assumed errors EθiL, EθiR in the horizontal azimuth angle with respect to the horizontal azimuth angle θi according to a moving direction of the pedestrian i.e., whether a left or right moving direction. The left and right assumed errors EθiL, EθiR may be different.

More specifically, in the fifth embodiment, a process shown in FIG. 14 is performed alternative to the process shown in FIG. 5. Since the operations in steps S241-S246, and S248 are similar to the operations in steps S141-S147, respectively, explanations for the operations in steps S241-S246, and S248 will not be repeated.

If it is determined in step S245 that the image object is a pedestrian, then, in step S247, the collision mitigation ECU 7 determines whether or not the pedestrian is moving. If it is determined in step S247 that the pedestrian is not moving, i.e., the pedestrian is stationary, then, in step S248 as in step S147, the collision mitigation ECU 7 sets the assumed error Eθi in the horizontal azimuth angle to a default value Iθi multiplied by constant C3 (greater than one). If it is determined in step S247 that the pedestrian is moving, then, in step S249, the collision mitigation ECU 7 determines whether or not the pedestrian is moving in the left direction (as a first direction). If it is determined in step S249 that the pedestrian is moving in the left direction, then, in step S250, the collision mitigation ECU 7 sets a left assumed error EθiL in the horizontal azimuth angle to the default value Iθi multiplied by a constant C4, and, further in step S250, sets a right assumed error EθiR in the horizontal azimuth angle to the default value Iθi multiplied by a constant C5. The left assumed error EθiL is an assumed error in the horizontal azimuth angle on the left hand side of the horizontal azimuth angle θi of the detection point Pi of the image object, and the right assumed error EθiR is an assumed error in the horizontal azimuth angle on the right hand side of the horizontal azimuth angle θi of the detection point Pi of the image object. As shown in FIG. 13, the image error domain Ri is defined not by θi−Eθi≤θ≤θi+Eθi, but by θi−EθiL≤θ≤θi+EθiR. The constant C5 is set greater than the constant C4, i.e., C5>C4.

If it is determined in step S249 that the pedestrian is moving not in the left direction, but in the right direction (as a second direction), then, in step S251, the collision mitigation ECU 7 sets the left assumed error EθiL in the horizontal azimuth angle to the default value Iθi multiplied by a constant C5, and, further in step S251, sets the right assumed error EθiR in the horizontal azimuth angle to the default value Iθi multiplied a constant C4.

That is, when it is determined that the image object is a pedestrian moving in the left direction, the right assumed error is set greater than the left assumed error. When it is determined that the image object is a pedestrian moving in the right direction (i.e., in the x-axis direction), the left assumed error is set greater than the right assumed error.

Figure 15A:
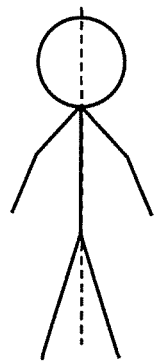
FIGS. 15A-15C show stationary and moving pedestrians.
Figure 15B:
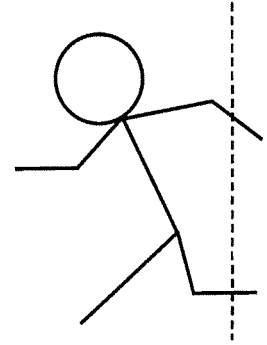
Figure 15C:
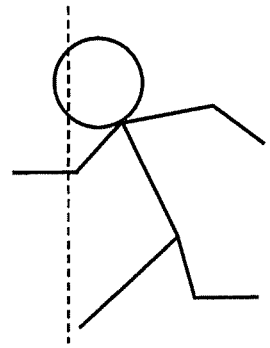

The present embodiment configured as above can provide similar benefits as in the first embodiment. The present embodiment can provide the following additional benefits. The present embodiment leads to the image error domain Ri being suited for the characteristics of a pedestrian moving laterally (i.e., moving in the X-direction), thereby preventing false determinations. As described above, the horizontal azimuth angle θi of the image object is determined on the basis of a distance from the FOE to a vertical line passing through the center of the image object. However, for the pedestrian moving laterally, as shown in FIGS. 15B, 15C, the vertical line is more likely to deviate from the actual center of the object, as compared to the vertical line passing through the center of the stationary object as shown in FIG. 15A. Since whether the vertical line deviates from the actual center of the object in the left or right-hand side direction of the center of the image object depends on the moving direction of the pedestrian, the left and right assumed errors are differentiated depending on the moving direction of the pedestrian.

Figure 16:
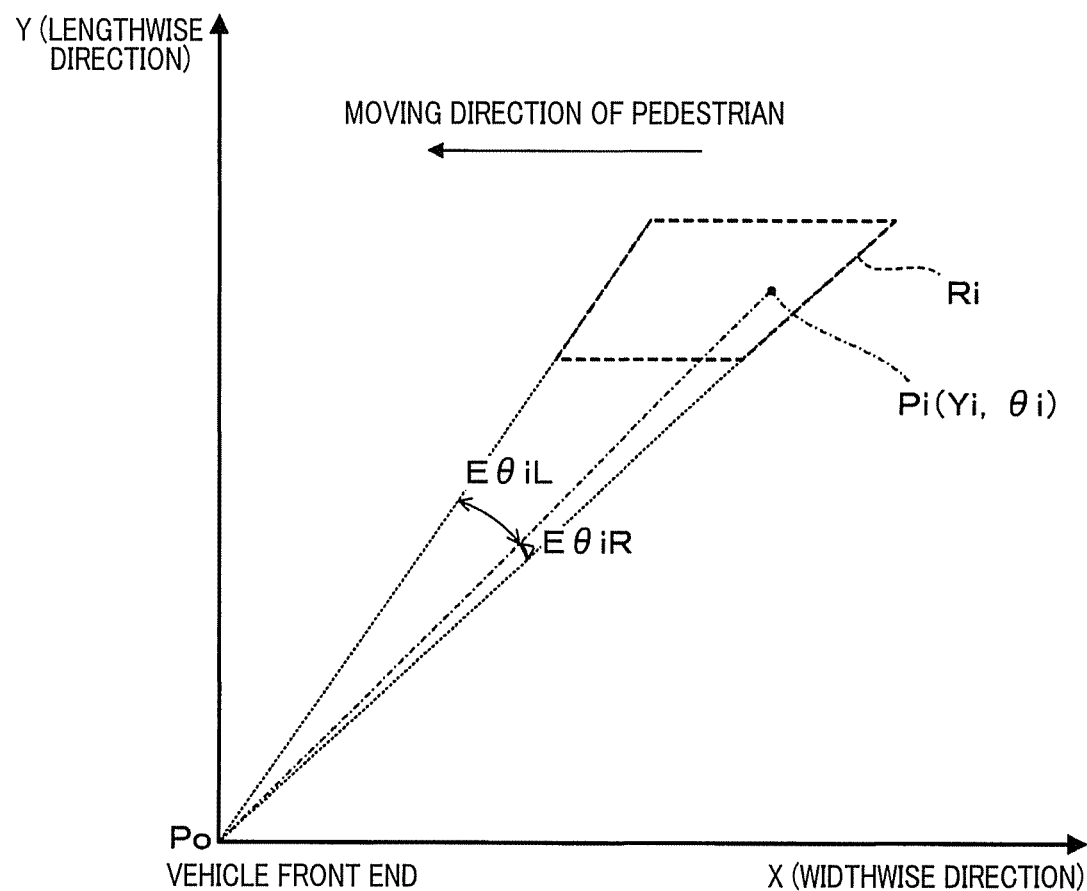
FIG. 16 shows an image error domain defined in a modification of the fifth embodiment.

In the present embodiment, the assumed error in the direction opposite to the moving direction of the pedestrian is set greater than the assumed error in the moving direction. In some alternative embodiments designed differently from the present embodiment, the assumed error in the moving direction of the pedestrian may be set greater than the assumed error in the direction opposite to the moving direction of the pedestrian, as shown in FIG. 16. In addition, in the present embodiment, the left and right assumed errors are differentiated from each other depending on the moving direction of the pedestrian. Alternatively, the left and right assumed errors may be differentiated from each other depending not only on the moving direction of the pedestrian, but also on the moving speed of the pedestrian. For example, when the pedestrian is moving in the left direction, the right assumed error is further increased with an increasing moving speed of the pedestrian as compared to the left assumed error.

(Other Embodiments)

There will now be explained some other embodiments of each of the first to fifth embodiments that may be devised without departing from the spirit and scope of the present invention.

(1) In each of the first to fifth embodiments, when it is determined that an overlapping domain of the radar error domain Rr and the image error domain Ri is present, then it is determined that the radar object and the image object are the same. Alternatively, when it is determined that the radar error domain Rr is included in the image error domain Ri or when it is determined that the image error domain Ri is included in the radar error domain Rr, then it may be determined that the radar object and the image object are the same.

(2) In each of the first to fifth embodiments, the degree of confidence in determination that the radar object and the image object are the same is defined by an angle difference between the horizontal azimuth angle of the detection point Pr of the radar object and the horizontal azimuth angle of the detection point Pi of the image object. Alternatively, for example, the degree of confidence in determination that the radar object and the image object are the same may be defined to be increased with an increasing area of an overlapping domain of the radar error domain Rr and the image error domain Ri (e.g., an area of the shaded domain in FIG. 3). Such a degree of confidence may prevent false determinations that the radar object and the image object are the same although horizontal azimuth angles of the radar object and the image object are close to each other, but linear distances of them are significantly different.

(3) In each of the first to fifth embodiments, the millimeter-wave radar 2 is used as a radar. Alternatively, another type of radar may be used as a radar.

(4) In each of the first to fifth embodiments, the present invention is applied to the collision mitigation apparatus 1. Alternatively, the present invention may be applied to another type of vehicle control apparatus.

(5) In each of the first to fifth embodiments, the collision mitigation ECU 7 as a controller is a separate member from the millimeter-wave radar 2 and the monocular camera 3. Alternatively, the collision mitigation ECU 7 may be included in either one or both of the millimeter-wave radar 2 and the monocular camera 3.

(6) In each of the first to fifth embodiments, the pedestrian and the vehicle are used as exemplified objects to be detected. Alternatively, other types of objects may be used to be detected.

(7) Each component of the present invention is conceptual. Therefore, for example, functions of one of the components in each of the first to fifth embodiments may be distributed over a plurality of components, or functions of some of components in each of the first to fifth embodiments are integrated or incorporated into one component. In addition, some of features of one of the first to fifth embodiments may be added to or replaced with some of features of another one of the first to fifth embodiments.

It will be understood by the skilled person that the embodiments described hereinbefore may be implemented by hardware, by software, or by a combination of software and hardware. The modules and functions described in connection with embodiments of the invention may be as a whole or in part implemented by microprocessors or computers which are suitably programmed such as to act in accordance with the methods explained in connection with embodiments of the invention. An apparatus implementing an embodiment of the invention may e.g. comprise a computer which is suitably programmed such that it is able to carry out a mechanism as described in the embodiments of the invention.

What is claimed is:

1. An object detection apparatus mounted in a vehicle, comprising:

a first domain definition unit configured to define a first object domain that is an error domain centered at a first detection point having a first predetermined size based on characteristics of a vehicle-mounted radar, the first detection point being indicative of a position of a first object detected based on detection information acquired using the vehicle-mounted radar relative to a reference point on an XY-plane, the reference point being a position of the vehicle-mounted radar, an X-axis direction of the XY-plane being a vehicle widthwise direction, and a Y-axis direction of the XY-plane being a vehicle lengthwise direction;

a second domain definition unit configured to define a second object domain that is an error domain centered at a second detection point having a second predetermined size based on characteristics of a vehicle-mounted monocular camera, the second detection point being indicative of a position of a second object detected based on an image captured by the vehicle-mounted monocular camera relative to the reference point on the XY-plane, the second object domain being defined by at least an azimuth angle range centered at an azimuth angle of the second detection point, the azimuth angle of the second detection point being an angle between a direction from the reference point to the second detection point and the vehicle lengthwise direction and being determined by a distance from a focus of expansion to a vertical line passing through a center of the second object in the image; and a determination unit configured to determine whether or not an overlapping domain of the first and second object domains is present on the XY-plane, and if it is determined that an overlapping domain of the first and second object domains is present on the XY-plane, then determine that the first and second objects are the same object.

2. The apparatus of claim 1, wherein the second domain definition unit is configured to determine whether the second object is a pedestrian or a vehicle via matching processing, and if it is determined that the second object is a pedestrian, then extend the azimuth angle range of the second object domain as compared to when it is determined that the second object is a vehicle.

3. The apparatus of claim 1, wherein the second domain definition unit is configured to determine whether the second object is a pedestrian moving in a first direction along the X-axis or in a second direction opposite to the first direction, and if it is determined that the second object is a pedestrian is moving in the first direction, then extend a half of the azimuth angle range of the second object domain on the first direction side of the second detection point to be greater than the other half of the azimuth angle range on the second direction side of the second detection point.

4. The apparatus of claim 1, wherein the second object domain is defined by the azimuth angle range and a Y-coordinate range centered at a Y-coordinate of the second detection point on the XY-plane.

5. The apparatus of claim 4, wherein the second domain definition unit is configured to extend the Y-coordinate range of the second object domain with an increasing Y-coordinate of the second detection point on the XY-plane.

6. The apparatus of claim 4, wherein the second domain definition unit is configured to determine whether the second object is a pedestrian or a vehicle via matching processing, and if it is determined that the second object is a vehicle, then extend the Y-coordinate range of the second object domain as compared to when it is determined that the second object is a pedestrian.

7. The apparatus of claim 1, wherein the second object domain is defined by the azimuth angle range and a linear distance range centered at a linear distance of the second detection point that is a linear distance from the reference point to the second detection point on the XY-plane.

8. The apparatus of claim 7, wherein the second domain definition unit is configured to extend the linear distance range of the second object domain with an increasing linear distance from the reference point to the second detection point.

9. The apparatus of claim 7, wherein the second domain definition unit is configured to, if the linear distance from the reference point to the second detection point is less than a predetermined value, then extend the azimuth angle range of the second object domain as compared to when the linear distance from the reference point to the second detection point is equal to or greater than the predetermined value.

10. The apparatus of claim 1, wherein the first object domain is defined by an azimuth angle range centered at an azimuth angle of the first detection point, the azimuth angle of the first detection point being an angle between a direction from the reference point to the first detection point and the vehicle lengthwise direction.

11. The apparatus of claim 10, wherein the first object domain is defined by the azimuth angle range and a linear distance range centered at a linear distance of the first detection point that is a linear distance from the reference point to the first detection point on the XY-plane.

12. The apparatus of claim 11, wherein the first domain definition unit is configured to extend the linear distance range of the first object domain with an increasing linear distance from the reference point to the first detection point.

13. The apparatus of claim 11, wherein the first domain definition unit is configured to, if the linear distance from the reference point to the first detection point is less than a predetermined value, then extend the azimuth angle range of the first object domain as compared to when the linear distance from the reference point to the first detection point is equal to or greater than the predetermined value.

14. The apparatus of claim 10, wherein the first domain definition unit is configured to, if the azimuth angle of the first detection point is equal to or greater than a predetermined value, then extend the azimuth angle range of the first object domain as compared to when the azimuth angle of the first object relative to the reference point is less than the predetermined value.

15. The apparatus of claim 1, wherein
the first object domain is defined by an X-coordinate range centered at an X-coordinate of the first detection point on the XY-plane, and
the first domain definition unit is configured to determine whether the first object is a pedestrian or a vehicle via matching processing, and if it is determined that the first object is a vehicle, then extend the X-coordinate range of the first object domain as compared to when it is determined that the first object is a pedestrian.

16. The apparatus of claim 1, further comprising a degree-of-confidence calculation unit configured to, if it is determined by the determination unit that the first and second objects are the same object, then calculate a degree of confidence in determination that the first and second objects are the same object.

17. The apparatus of claim 16, wherein the degree of confidence is increased with a decreasing angle difference between an azimuth angle of the first detection point from the vehicle lengthwise direction and the azimuth angle of the second detection point from the vehicle lengthwise direction.

18. The apparatus of claim 16, wherein the degree of confidence is increased with an increasing area of the overlapping domain of the first and second object domains.

19. The apparatus of claim 1, wherein the determination unit is configured to, if it is determined that the first and second objects are the same object, then define a position of the object determined the same on the XY-plane by a Y-coordinate of the first detection point and the azimuth angle of the second detection point from the vehicle lengthwise direction.

20. An object detection apparatus mounted in a vehicle, comprising:
a first domain definition unit configured to define a first object domain that is an error domain centered at a first detection point having a first predetermined size based on characteristics of a vehicle-mounted radar, the first detection point being indicative of a position of a first object detected based on detection information acquired using the vehicle-mounted radar relative to a reference point on an XY-plane, the reference point being a position of the vehicle-mounted radar, an X-axis direction of the XY-plane being a vehicle widthwise direction, and a Y-axis direction of the XY-plane being a vehicle lengthwise direction;
a second domain definition unit configured to define a second object domain that is an error domain centered at a second detection point having a second predetermined size based on characteristics of a vehicle-mounted monocular camera, the second detection point being indicative of a position of a second object detected based on an image captured by the vehicle-mounted monocular camera relative to the reference point on the XY-plane, the second object domain being defined by at least an azimuth angle range centered at an azimuth angle of the second detection point, the azimuth angle of the second detection point being an angle between a direction from the reference point to the second detection point and the vehicle lengthwise direction and being determined by a distance from a focus of expansion to a vertical line passing through a center of the second object in the image, the second domain definition unit being configured to, based on the image captured by the vehicle-mounted monocular camera, determine whether the second object is a pedestrian or a vehicle via matching processing, and if it is determined that the second object is a pedestrian, then extend the azimuth angle range of the second object domain as compared to when it is determined that the second object is a vehicle; and
a determination unit configured to determine whether or not an overlapping domain of the first and second object domains is present on the XY-plane, and if it is determined that an overlapping domain of the first and second object domains is present on the XY-plane, then determine that the first and second objects are the same object.

21. An object detection apparatus mounted in a vehicle, comprising:
a first domain definition unit configured to define a first object domain that is an error domain centered at a first detection point and having a first predetermined size based on characteristics of a vehicle-mounted radar, the first detection point being indicative of a position of a first object detected based on detection information acquired using the vehicle-mounted radar relative to a reference point on an XY-plane, the reference point being a position of the vehicle-mounted radar, an X-axis direction of the XY-plane being a vehicle widthwise direction, and a Y-axis direction of the XY-plane being a vehicle lengthwise direction;
a second domain definition unit configured to define a second object domain that is an error domain centered at a second detection point and having a second predetermined size based on characteristics of a vehicle-mounted monocular camera, the second detection point being indicative of a position of a second object detected based on an image captured by the vehicle-mounted monocular camera relative to the reference point on the XY-plane, the second object domain being defined by an azimuth angle range and a linear distance range, the azimuth angle range being centered at an azimuth angle of the second detection point, the azimuth angle of the second detection point being an angle between a direction from the reference point to the second detection point and the vehicle lengthwise direction and being determined by a distance from a focus of expansion to a vertical line passing through a center of the second object in the image, the linear distance range being centered at a linear distance of the second detection point that is a linear distance from the reference point to the second detection point on the XY-plane; and
a determination unit configured to determine whether or not an overlapping domain of the first and second object domains is present on the XY-plane, and if it is determined that an overlapping domain of the first and second object domains is present on the XY-plane, then determine that the first and second objects are the same object.

22. An object detection apparatus mounted in a vehicle, comprising:
a first domain definition unit configured to define a first object domain that is an error domain centered at a first detection point having a first predetermined size based on characteristics of a vehicle-mounted radar, the first detection point being indicative of a position of a first object detected based on detection information acquired using the vehicle-mounted radar relative to a reference point on an XY-plane, the reference point being a position of the vehicle-mounted radar, an X-axis direction of the XY-plane being a vehicle widthwise direction, and a Y-axis direction of the XY-plane being a vehicle lengthwise direction;
a second domain definition unit configured to define a second object domain that is an error domain centered at a second detection point having a second predetermined size based on characteristics of a vehicle-mounted monocular camera, the second detection point being indicative of a position of a second object detected based on an image captured by the vehicle-mounted monocular camera relative to the reference point on the XY-plane, the second object domain being defined by at least an azimuth angle range centered at an azimuth angle of the second detection point, the azimuth angle of the second detection point being an angle between a direction from the reference point to the second detection point and the vehicle lengthwise direction and being determined by a distance from a focus of expansion to a vertical line passing through a center of the second object in the image;
a determination unit configured to determine whether or not an overlapping domain of the first and second object domains is present on the XY-plane, and if it is determined that an overlapping domain of the first and second object domains is present on the XY-plane, then determine that the first and second objects are the same object; and
a degree-of-confidence calculation unit configured to, if it is determined by the determination unit that the first and second objects are the same object, then calculate a degree of confidence in determination that the first and second objects are the same object, the degree of confidence being increased with a decreasing angle difference between an azimuth angle of the first detection point from the vehicle lengthwise direction and the azimuth angle of the second detection point from the vehicle lengthwise direction.

23. An object detection apparatus mounted in a vehicle, comprising:
a first domain definition unit configured to define a first object domain that is an error domain centered at a first detection point having a first predetermined size based on characteristics of a vehicle-mounted radar, the first detection point being indicative of a position of a first object detected based on detection information acquired using the vehicle-mounted radar relative to a reference point on an XY-plane, the reference point being a position of the vehicle-mounted radar, an X-axis direction of the XY-plane being a vehicle widthwise direction, and a Y-axis direction of the XY-plane being a vehicle lengthwise direction;
a second domain definition unit configured to define a second object domain that is an error domain centered at a second detection point having a second predetermined size based on characteristics of a vehicle-mounted monocular camera, the second detection point being indicative of a position of a second object detected based on an image captured by the vehicle-mounted monocular camera relative to the reference point on the XY-plane, the second object domain being defined by at least an azimuth angle range centered at an azimuth angle of the second detection point, the azimuth angle of the second detection point being an angle between a direction from the reference point to the second detection point and the vehicle lengthwise direction and being determined by a distance from a focus of expansion to a vertical line passing through a center of the second object in the image;
a determination unit configured to determine whether or not an overlapping domain of the first and second object domains is present on the XY-plane, and if it is determined that an overlapping domain of the first and second object domains is present on the XY-plane, then determine that the first and second objects are the same object; and a degree-of-confidence calculation unit configured to, if it is determined by the determination unit that the first and second objects are the same object, then calculate a degree of confidence in determination that the first and second objects are the same object, the degree of confidence being increased with an increasing area of the overlapping domain of the of the first and second object domains.

24. An object detection apparatus mounted in a vehicle, comprising:
 a first domain definition unit configured to define a first object domain that is an error domain centered at a first detection point having a first predetermined size based on characteristics of a vehicle-mounted radar, the first detection point being indicative of a position of a first object detected based on detection information acquired using the vehicle-mounted radar relative to a reference point on an XY-plane, the reference point being a position of the vehicle-mounted radar, an X-axis direction of the XY-plane being a vehicle widthwise direction, and a Y-axis direction of the XY-plane being a vehicle lengthwise direction;
 a second domain definition unit configured to define a second object domain that is an error domain centered at a second detection point having a second predetermined size based on characteristics of a vehicle-mounted monocular camera, the second detection point being indicative of a position of a second object detected based on an image captured by the vehicle-mounted monocular camera relative to the reference point on the XY-plane, the second object domain being defined by at least an azimuth angle range centered at an azimuth angle of the second detection point, the azimuth angle of the second detection point being an angle between a direction from the reference point to the second detection point and the vehicle lengthwise direction and being determined by a distance from a focus of expansion to a vertical line passing through a center of the second object in the image; and
 a determination unit configured to determine whether or not an overlapping domain of the first and second object domains is present on the XY-plane, and if it is determined that an overlapping domain of the first and second object domains is present on the XY-plane, then determine that the first and second objects are the same object, the determination unit being configured to, if it is determined that the first and second objects are the same object, then define a position of the object determined the same on the XY-plane by a Y-coordinate of the first detection point and the azimuth angle of the second detection point from the vehicle lengthwise direction.

* * * * *